United States Patent
Park et al.

(10) Patent No.: US 10,684,620 B2
(45) Date of Patent: Jun. 16, 2020

(54) VEHICLE CONTROL DEVICE MOUNTED ON VEHICLE AND METHOD FOR CONTROLLING THE VEHICLE

(71) Applicant: LG Electronics Inc., Seoul (KR)

(72) Inventors: Minjae Park, Seoul (KR); Jiyeong Park, Seoul (KR); Hyunsun Lyu, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

(21) Appl. No.: 15/826,378

(22) Filed: Nov. 29, 2017

(65) Prior Publication Data
US 2019/0011914 A1    Jan. 10, 2019

(30) Foreign Application Priority Data

Jul. 7, 2017 (KR) .................... 10-2017-0086573

(51) Int. Cl.
*G05D 1/00* (2006.01)
*B60W 40/09* (2012.01)
(Continued)

(52) U.S. Cl.
CPC ........... *G05D 1/0061* (2013.01); *B60W 40/08* (2013.01); *B60W 40/09* (2013.01); *B60W 50/14* (2013.01);
(Continued)

(58) Field of Classification Search
CPC .... B60W 2050/0072; B60W 2050/007; G05D 1/0061; B60Q 1/46; B60Q 1/26; B60Q 1/50; B60Q 1/503; B60Q 1/506
See application file for complete search history.

(56) References Cited

U.S. PATENT DOCUMENTS 6,226,570 B1 *  5/2001  Hahn .................... B60K 28/066
                                                701/1
8,626,554 B2 *  1/2014  Chin .................... G06Q 10/109
                                                705/7.16
(Continued)

FOREIGN PATENT DOCUMENTS

DE    102014212596    12/2015
EP       2314489       4/2011
(Continued)

OTHER PUBLICATIONS

Extended European Search Report in European Application No. 17001943.4, dated Jun. 27 2018, 8 pages.

*Primary Examiner* — Thomas G Black
*Assistant Examiner* — Sara J Lewandroski
(74) *Attorney, Agent, or Firm* — Fish & Richardson P.C.

(57) ABSTRACT

The present invention relates to a vehicle control device provided in a vehicle and a method of controlling the vehicle. A vehicle control device according to an embodiment of the present invention includes a sensing unit configured to sense a driver's state, and a processor configured to decide a first time required for a vehicle currently traveling in an autonomous driving mode to reach a point where the vehicle is to be switched to a manual driving mode, and decide a second time required for the driver to be ready to perform manual driving based on the driver's state, wherein the processor outputs notification information such that the second time is shortened when the second time is longer than the first time.

18 Claims, 20 Drawing Sheets

(51) Int. Cl.
  *B60W 50/14* (2020.01)
  *B60W 40/08* (2012.01)
  *B60Q 5/00* (2006.01)
  *B60Q 1/46* (2006.01)
  *B60W 50/00* (2006.01)

(52) U.S. Cl.
  CPC ............... *B60Q 1/46* (2013.01); *B60Q 5/005* (2013.01); *B60W 2040/0881* (2013.01); *B60W 2050/0096* (2013.01); *G05D 2201/0213* (2013.01)

(56) References Cited

U.S. PATENT DOCUMENTS

| | | | |
|---|---|---|---|
| 8,731,530 B1* | 5/2014 | Breed | H04M 1/72577 455/414.1 |
| 9,953,538 B1* | 4/2018 | Matthiesen | B60Q 1/268 |
| 2015/0051781 A1* | 2/2015 | Schnieders | B60W 30/00 701/23 |
| 2015/0094899 A1* | 4/2015 | Hackenberg | B60W 50/082 701/23 |
| 2015/0253778 A1* | 9/2015 | Rothoff | G05D 1/0088 701/25 |
| 2015/0375757 A1* | 12/2015 | Schiek | B60W 50/14 701/23 |
| 2016/0246298 A1* | 8/2016 | Sato | B60W 40/08 |
| 2017/0205823 A1* | 7/2017 | Arndt | B60W 50/08 |
| 2017/0368936 A1* | 12/2017 | Kojima | B60W 40/06 |
| 2018/0173237 A1* | 6/2018 | Reiley | G05D 1/0214 |
| 2018/0292820 A1* | 10/2018 | Marberger | B60W 50/14 |
| 2018/0339714 A1* | 11/2018 | Smid | B60W 50/14 |
| 2018/0356818 A1* | 12/2018 | Arai | B60Q 1/503 |
| 2019/0110729 A1* | 4/2019 | Yamataka | A61B 5/1495 |
| 2019/0129417 A1* | 5/2019 | Noto | B60W 50/14 |

FOREIGN PATENT DOCUMENTS

| | | |
|---|---|---|
| EP | 2916190 | 9/2015 |
| JP | 2016064773 | 4/2016 |
| JP | 2016115356 | 6/2016 |
| JP | 2017030518 | 2/2017 |
| KR | 1020140043536 | 4/2014 |
| WO | WO2016092796 | 6/2016 |

* cited by examiner

VEHICLE CONTROL DEVICE MOUNTED ON VEHICLE AND METHOD FOR CONTROLLING THE VEHICLE

CROSS-REFERENCE TO RELATED APPLICATION

Pursuant to 35 USC § 119 (a), this application claims the benefit of an earlier filing date and priority to Korean Application No. 10-2017-0086573, filed on Jul. 7, 2017, the contents of which are incorporated by reference herein in its entirety.

BACKGROUND OF THE INVENTION

1. Field of the Invention

The present invention relates to a vehicle control device mounted in a vehicle and a method for controlling the vehicle.

2. Background of the Invention

A vehicle is an apparatus capable of moving a user in the user-desired direction. Typically, a representative example may be a car.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

A vehicle may be provided with various types of lamps. In general, the vehicle includes various vehicle lamps having a lighting function of facilitating articles or objects near the vehicle to be recognized during driving at night, and a signaling function of notifying a driving state of the vehicle to other vehicles or pedestrians.

For example, the vehicle may include devices operating in a manner of directly emitting light using lamps, such as a head lamp emitting light to a front side to ensure a driver's view, a brake lamp turned on when slamming the brake on, turn indicator lamps used upon a left turn or a right turn.

As another example, reflectors for reflecting light to facilitate the vehicle to be recognized from outside are mounted on front and rear sides of the vehicle.

Installation criteria and standards of the lamps for the vehicle are regulated as rules to fully exhibit each function.

Meanwhile, as the development of the advanced driving assist system (ADAS) is actively undergoing in recent time, development of a technology for optimizing user's convenience and safety while driving a vehicle is required.

In addition, with development of an autonomous driving mode of the vehicle, various technologies used for switching between a manual driving mode and the autonomous driving mode of the vehicle have been actively developed.

SUMMARY OF THE INVENTION

An aspect of the present invention is to provide a vehicle control device, capable of switching a driving mode of the vehicle in an optimized manner, and a method of controlling the vehicle.

Another aspect of the present invention is to provide a vehicle control device, capable of making a driver ready to perform manual driving before a time point to switch a driving mode to a manual driving mode, when an autonomous driving mode is switched to the manual driving mode, and a method of controlling the vehicle.

Still another aspect of the present invention is to provide a vehicle control device, capable of switching an autonomous driving mode to a manual driving mode at an optimized time point, and a method of controlling the vehicle.

The tasks to be solved in the present invention may not be limited to the aforementioned, and other problems to be solved by the present invention will be obviously understood by a person skilled in the art based on the following description.

To achieve these and other advantages and in accordance with the purpose of this specification, as embodied and broadly described herein, there is provided a vehicle control device, including a camera, a sensing unit configured to sense a state of a driver, and a processor configured to decide a first time required for a vehicle currently traveling in an autonomous driving mode to reach a point where the vehicle is to be switched to a manual driving mode, and decide a second time required for the driver to be ready to perform manual driving based on the driver's state, wherein the processor outputs notification information such that the second time is shortened when the second time is longer than the first time.

In one embodiment disclosed herein, the processor may output the notification information such that the second time becomes shorter than the first time.

In one embodiment disclosed herein, wherein the processor may re-decide the second time required for the driver to be ready to perform the manual driving after outputting the notification information, and decide whether or not to output the notification information based on the re-decided second time and the first time.

In one embodiment disclosed herein, the processor may decelerate the vehicle currently traveling in the autonomous driving mode, such that the first time extends, when the second time is longer than the first time.

In one embodiment disclosed herein, the processor may switch a driving mode of the vehicle from the autonomous driving mode to the manual driving mode based on that a difference between the first time and the second time is within a predetermined time.

In one embodiment disclosed herein, the switching from the autonomous driving mode to the manual driving mode may be performed in a stepwise manner according to preset steps.

In one embodiment disclosed herein, the processor may decide a third time required for a passenger seated next the driver through the sensing unit to be ready to perform the manual driving.

In one embodiment disclosed herein, the processor may output notification information to the passenger such that the second time required for the driver to be ready to perform the manual driving is shortened, when the second time is longer than the first time and the third time is shorter than the first time.

In one embodiment disclosed herein, the processor may grant a manual driving authority of the vehicle to a driving device provided on the passenger side, based on that the passenger is ready to perform the manual driving, when the second time is longer than the first time and the third time is shorter than the first time.

In one embodiment disclosed herein, the processor may transfer the manual driving authority of the vehicle from the driving device provided on the passenger side to a driving device provided on the driver side, when the driver is ready to perform the manual driving in a state where the vehicle passes through the point to be driven in the manual driving mode and the passenger performs the manual driving.

In one embodiment disclosed herein, the processor may output a notification sound to outside of the vehicle or turn on a lamp provided outside the vehicle in a preset manner, to notify a delay in switching to the manual driving mode to other vehicles, when the second time is longer than the first time and the other vehicles exist within a predetermined distance from the vehicle.

In one embodiment disclosed herein, the processor may not output the notification information when the second time is shorter than the first time.

In one embodiment disclosed herein, the processor may switch a driving mode of the vehicle from the autonomous driving mode to the manual driving mode based on the state that the driver is ready to perform the manual driving when the second time is shorter than the first time.

In one embodiment disclosed herein, the processor may switch the driving mode of the vehicle from the autonomous driving mode to the manual driving mode, based on at least one of a completion of a use of a mobile terminal of the driver and a termination of a content that is currently played back, when the second time is shorter than the first time.

In one embodiment disclosed herein, the vehicle control device may further include a communication unit configured to perform communication with a wearable terminal worn on the driver's body, and the processor may change the second time based on a state of the driver received through the wearable terminal.

In one embodiment disclosed herein, the processor may output the notification information so that the driver is ready to perform the manual driving, irrespective of the point at which the vehicle being driven in the autonomous driving mode is to be switched to the manual driving mode, based on schedule information and a current time.

A vehicle according to one embodiment of the present invention may include the vehicle control device described in this specification.

A method for controlling a vehicle according to one embodiment of the present invention may include deciding a first time required for a vehicle currently traveling in an autonomous driving mode to reach a point where the vehicle is to be switched to a manual driving mode, deciding a second time required for a driver to be ready to perform manual driving, based on a state of the driver, and outputting notification information such that the second time is shortened, when the second time is longer than the first time.

In one embodiment disclosed herein, the outputting may be configured to output the notification information so that the second time becomes shorter than the first time.

In one embodiment disclosed herein, the method may further include re-deciding the second time required for the driver to be ready to perform the manual driving after outputting the notification information, and deciding whether or not to output the notification information based on the re-decided second time and the first time.

The details of other embodiments are included in the detailed description and drawings.

According to an embodiment of the present invention, there is one or more of the following effects.

First, the present invention can provide a vehicle control device, capable of providing a notification (feedback) to a driver such that the driver can be ready to perform manual driving before a vehicle reaches a point where a driving mode of the vehicle is to be switched from an autonomous driving mode to a manual driving mode, and a method of controlling the vehicle.

Second, the present invention can provide a vehicle control device, capable of switching a driving mode of a vehicle from an autonomous driving mode to a manual driving mode in an optimized manner by comparing a remaining time until switching to the manual driving mode with a time required for a driver to be ready to perform manual driving, and a method of controlling the vehicle.

The effects of the present invention are not limited to those effects mentioned above, and other effects not mentioned may be clearly understood by those skilled in the art from the description of the appended claims.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
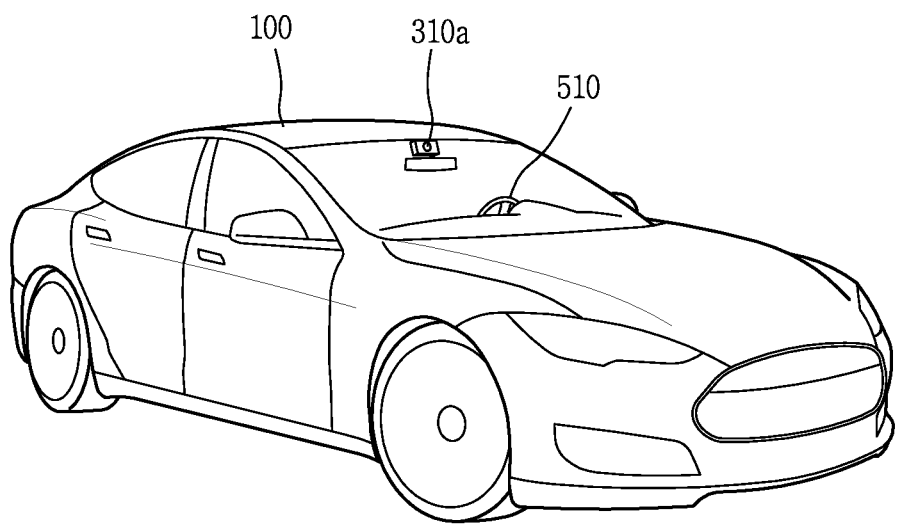
FIG. 1 is a view illustrating an appearance of a vehicle according to an embodiment of the present invention.
Figure 1:
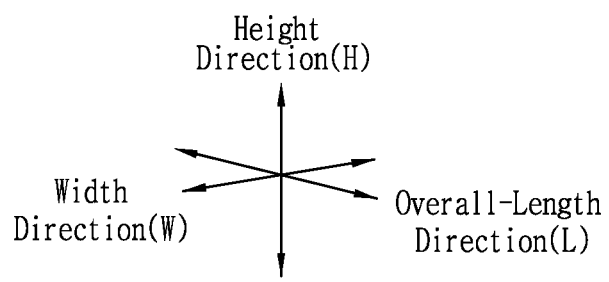

FIG. 1 is a view illustrating appearance of a vehicle in accordance with an embodiment of the present invention.

Figure 2:
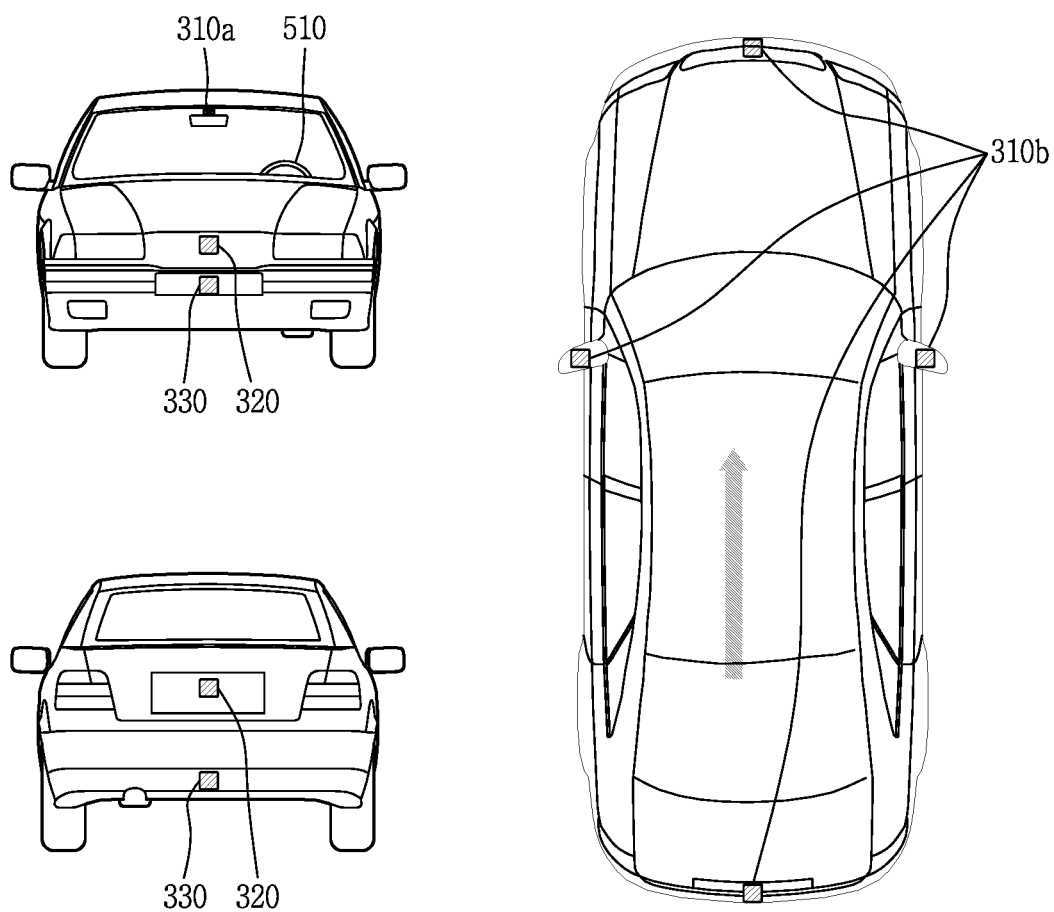
FIG. 2 is a view in which a vehicle according to an embodiment of the present disclosure is seen at various angles.

FIG. 2 is a view illustrating appearance of a vehicle at various angles in accordance with an embodiment of the present invention.

Figure 3:
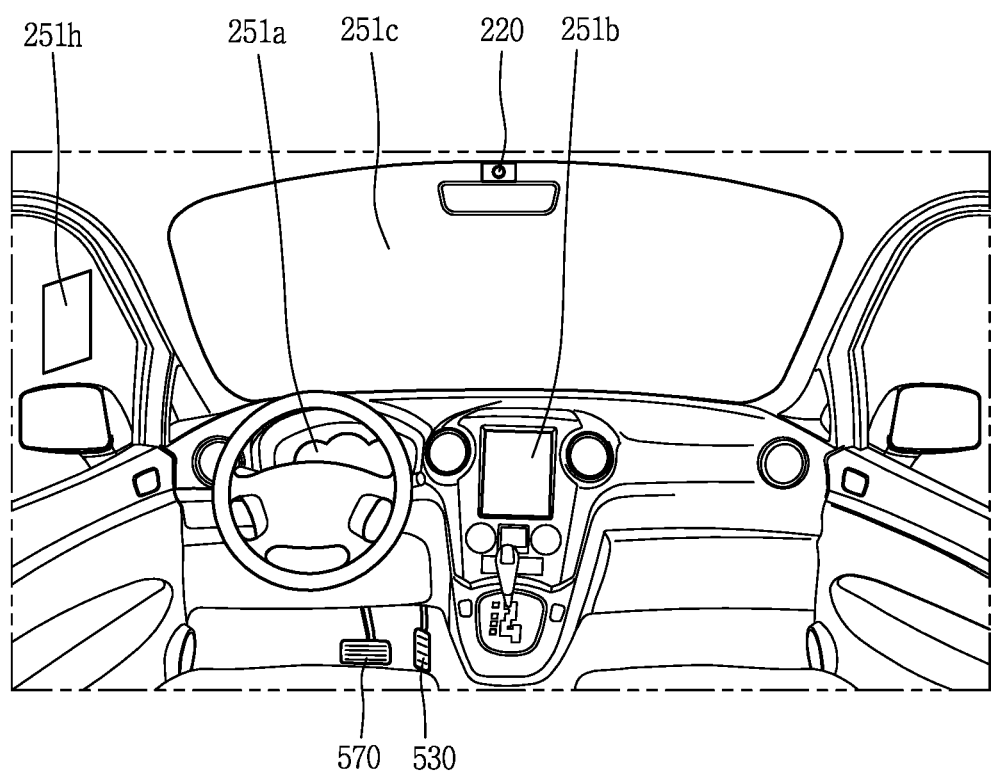
FIGS. 3 and 4 are views illustrating an inside of a vehicle according to an embodiment of the present invention.
Figure 4:
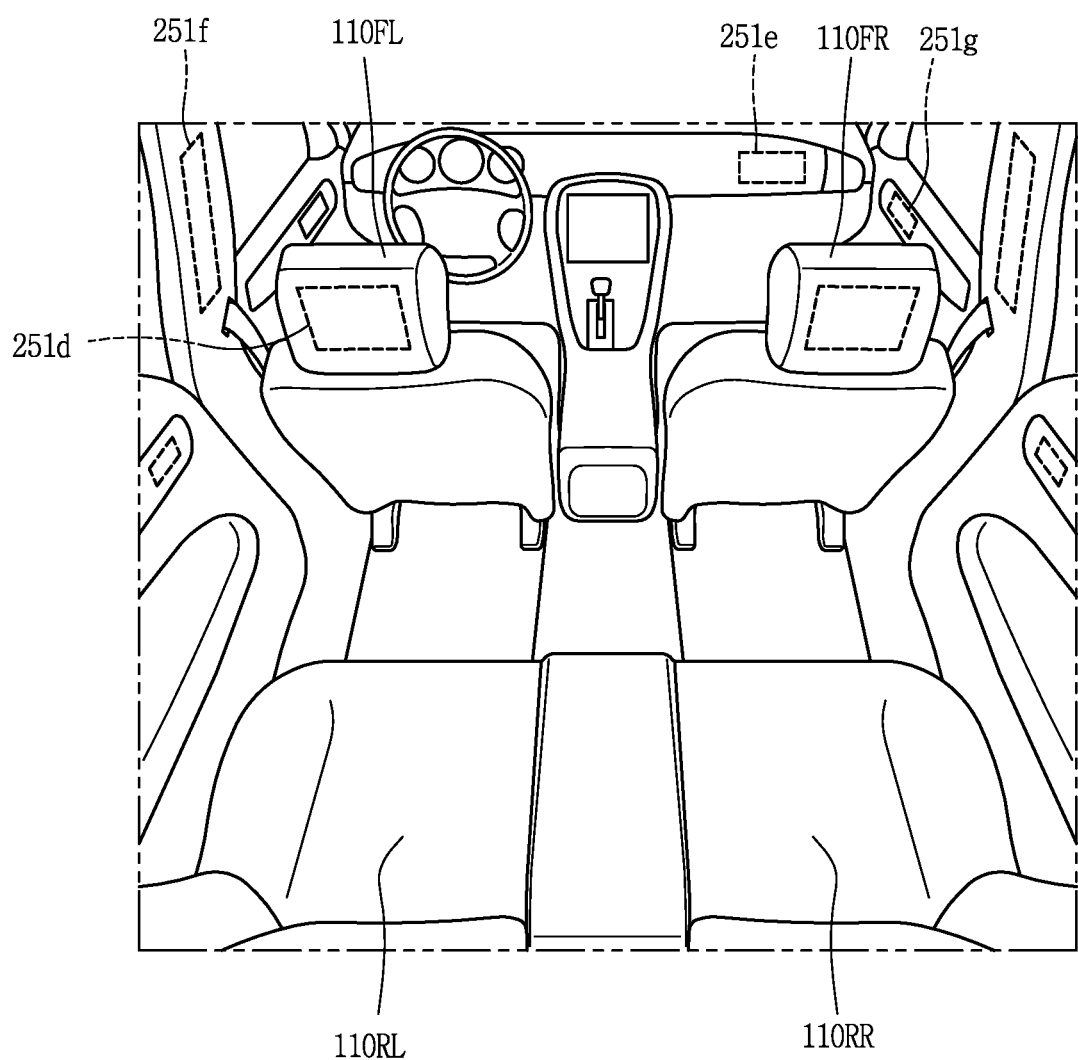

FIGS. 3 and 4 are views illustrating an inside of a vehicle in accordance with an embodiment of the present invention.

Figure 5:
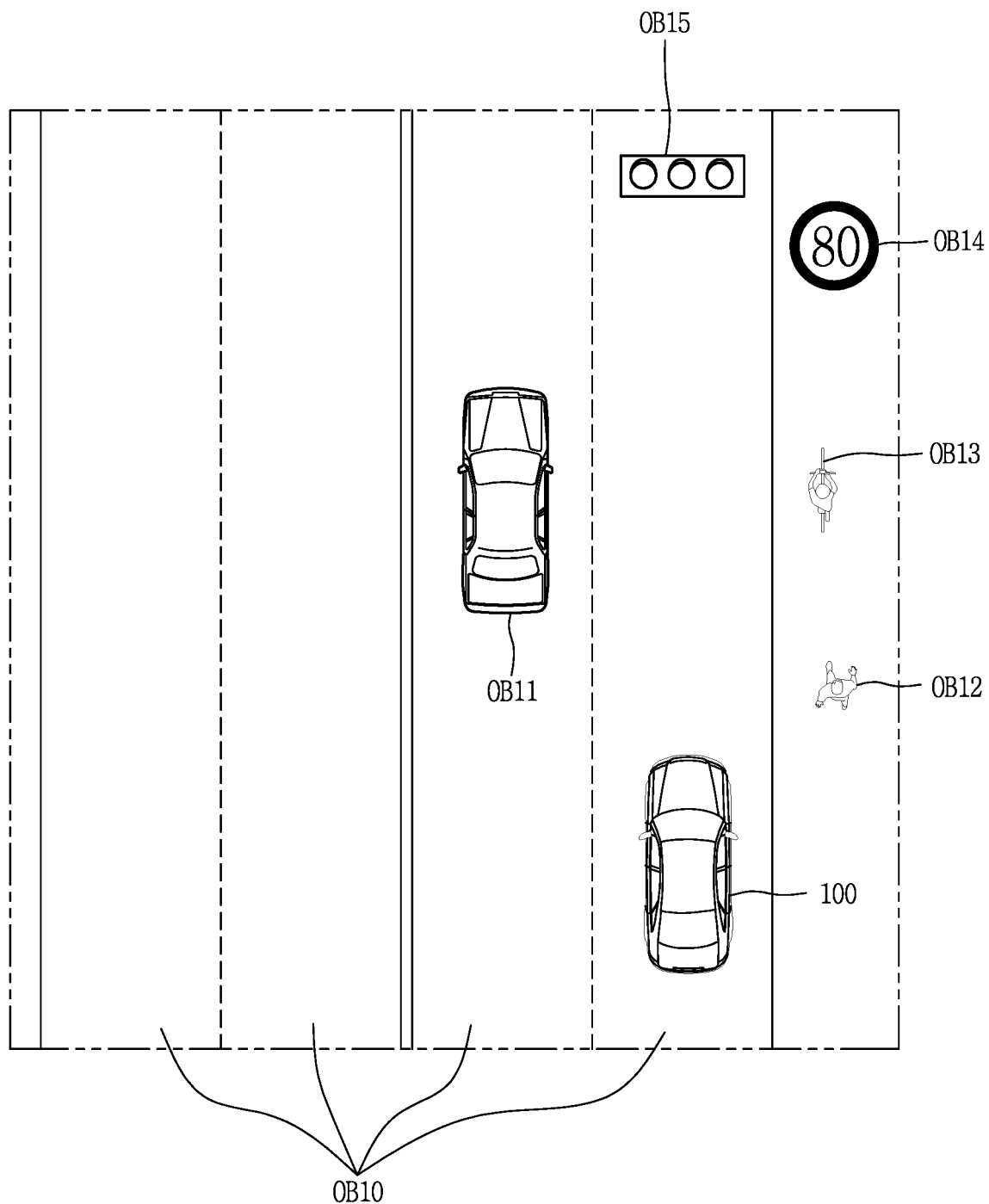
FIGS. 5 and 6 are views referred for explaining objects according to an embodiment of the present invention.
Figure 6:
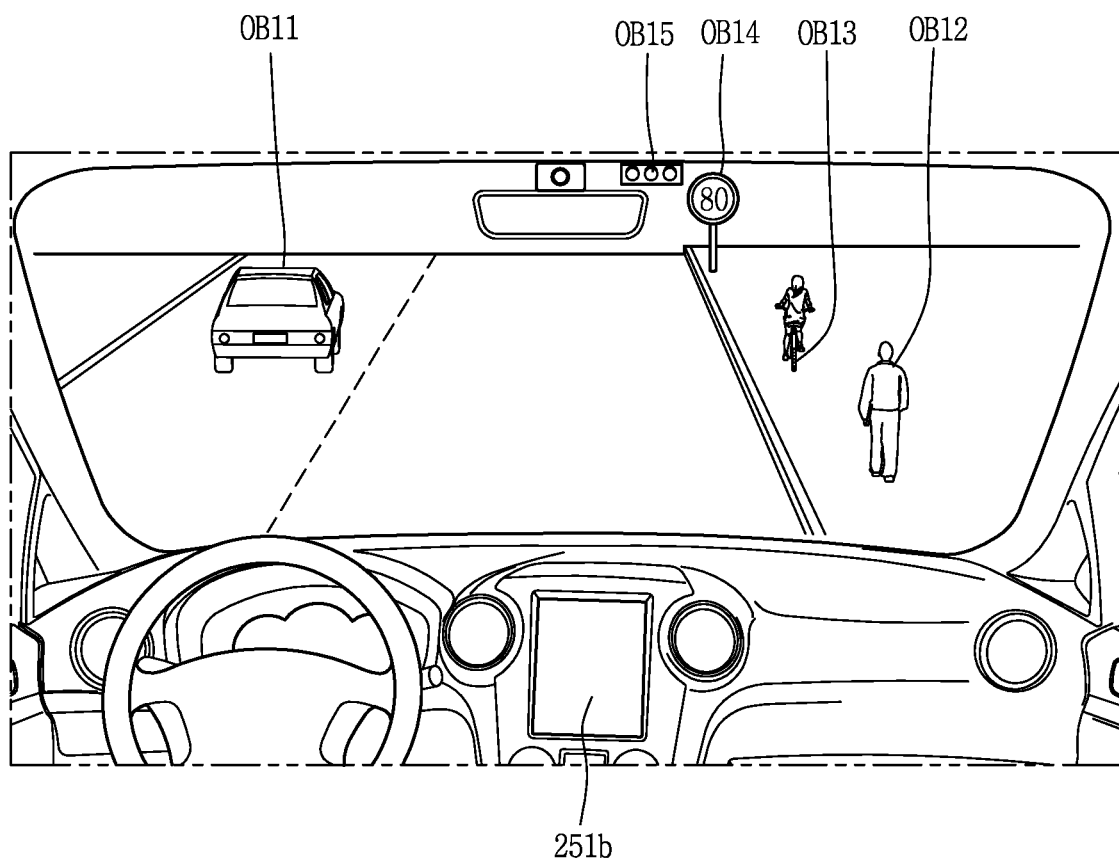

FIGS. 5 and 6 are reference views illustrating objects in accordance with an embodiment of the present invention.

Figure 7:
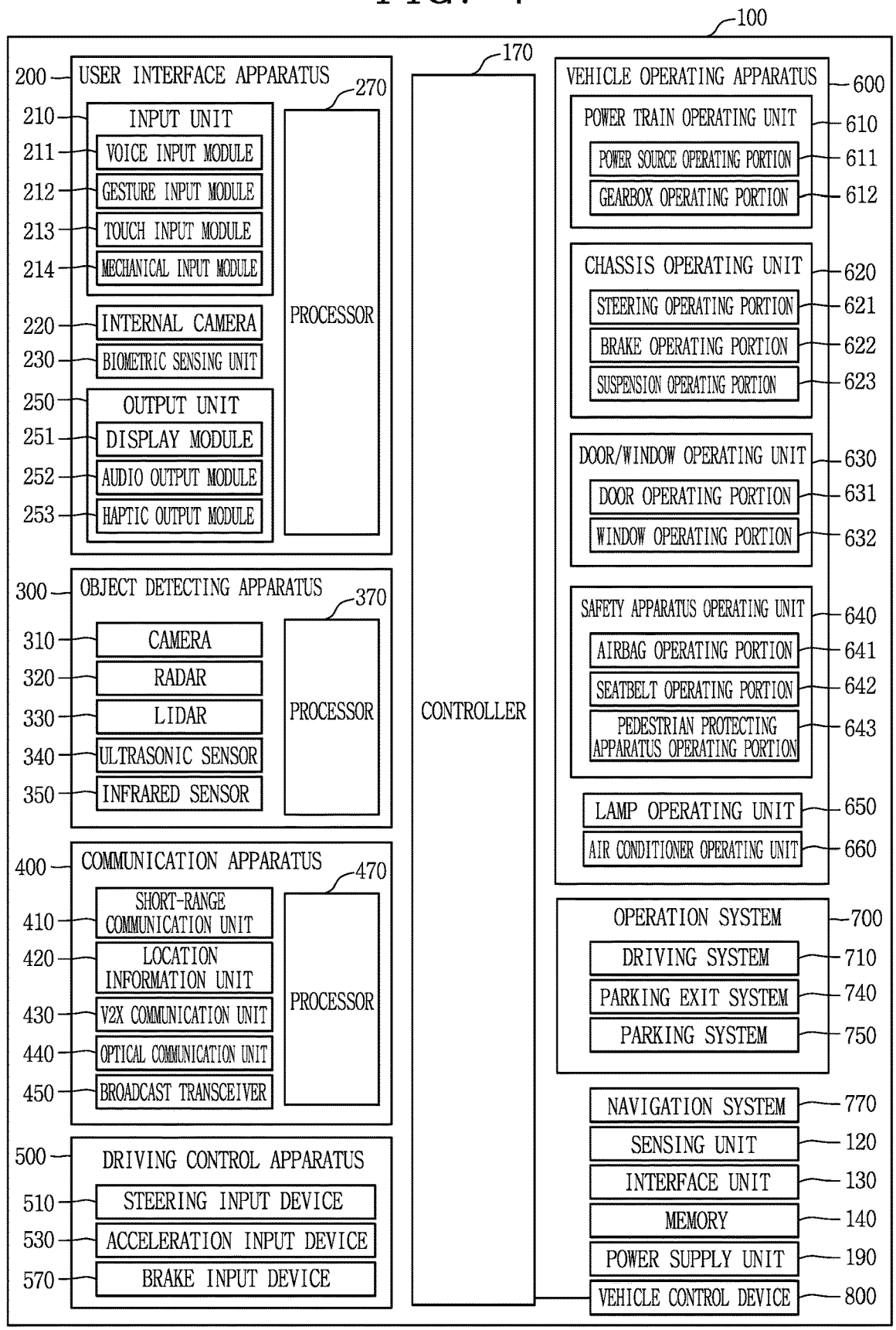
FIG. 7 is a block diagram referred for explaining a vehicle according to an embodiment of the present invention.

FIG. 7 is a block diagram illustrating a vehicle in accordance with an embodiment of the present invention.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

Meanwhile, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to embodiments, the operation system 700 may further include other components in addition to components to be described, or may not include some of the components to be described.

Meanwhile, the operation system 700 may include a processor. Each unit of the operation system 700 may individually include a processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of the components included in the vehicle control device 800 according to an embodiment of the present invention with reference to the accompanying drawings.

Figure 8:
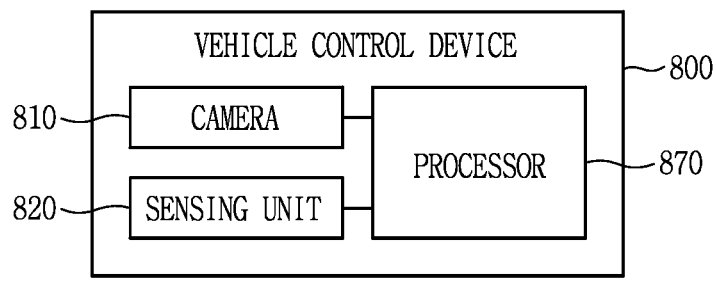
FIG. 8 is a conceptual view illustrating a vehicle control device according to an embodiment of the present invention.

FIG. 8 is a conceptual view illustrating a vehicle control device according to an embodiment of the present invention.

The vehicle control device 800 related to the present invention may include a camera 810, a sensing unit 820, and a processor 870 and the like.

First, the vehicle control device 800 related to the present invention may include a camera 810 configured to capture an outside of the vehicle 100.

The camera 810 may be the camera 310 included in the object detecting apparatus 300. The camera 810 may be configured to capture an image. In addition, the camera 810 may be configured to receive an image in real time. The received image or captured image may be used variously under the control of the processor 870.

For example, the processor 870 may decide (determine, extract, detect, and sense) a point at which the vehicle must be driven in a manual driving mode based on the image received through the camera 810.

Here, the point at which the vehicle must be driven in the manual driving mode may be a starting point of a section (road) in which the vehicle must be driven in the manual driving mode or a starting section of a road defined to drive the vehicle in the manual driving mode.

For example, when an object (e.g., a signboard or guidance information drawn on a road) indicating the point at which the vehicle is to be driven in the manual driving mode is detected on the image received through the camera 810, the processor 870 may decide a distance between the object and the vehicle 100. Here, the distance between the object and the vehicle 100 may refer to a distance between the point (starting point) to drive the vehicle in the manual driving mode and the vehicle 100.

Thereafter, the processor 870 may decide (determine, extract, detect, sense, calculate) a first time required for the vehicle currently traveling in the autonomous driving mode to reach the point at which the vehicle is to be switched into the manual driving mode, on the basis of a driving speed of the vehicle 100 and the distance between the point (starting point) to switch the driving mode of the vehicle to the manual driving mode and the vehicle 100.

The first time may refer to a time (or a remaining time) taken by the vehicle 100 to reach the point where the vehicle is to be driven in the manual driving mode.

The first time extends as the distance between the point (starting point) to drive the vehicle in the manual driving mode and the vehicle 100 increases and the driving speed of the vehicle 100 is slowed down.

The processor 870 may decide the point to start the driving in the manual driving mode (the starting point of the section in which the vehicle is to be driven in the manual driving mode), by being combined with any one or at least two of the camera 810, the radar 320, the LiDAR 330, the ultrasonic sensor 340 or the infrared sensor 350.

In addition, the processor 870 may decide the point to start the driving in the manual driving mode (the starting point of the section in which the vehicle is to be driven in the manual driving mode), on the basis of at least one of map information prestored in the memory 140 or information received through the communication device 400 (e.g., map information or information related to a driving road).

For convenience of explanation, this specification is described under assumption that the first time which is taken by the vehicle to reach the point where the vehicle currently traveling in the autonomous driving mode is to be driven in the manual driving mode is decided based on the image received through the camera 810. However, the related content, namely, deciding the first time may alternatively be made by the processor 870 using at least one of the radar 320, the LiDAR 330, the ultrasound sensor 340 or the infrared sensor 350, or using the memory 140 or the communication device 400.

In addition, the vehicle control device 800 related to the present invention may include a sensing unit 820.

The sensing unit 820 may be the object detecting apparatus 300 described in FIG. 7, the sensing unit 120 provided in the vehicle 100, the internal camera 220 provided in the vehicle 100, or the biometric sensing unit 230 provided in the vehicle 100.

The sensing unit 820 may be a separate sensing unit independent of the object detecting apparatus 300 provided in the vehicle or the sensing unit 120 provided in the vehicle 100. Even if the sensing unit 820 is an independent sensing unit, the sensing unit 820 may include a feature of at least one of the sensing unit 120, the internal camera 220, the biometric sensing unit 230, or the object detecting apparatus 300.

The sensing unit 820 may include the camera 310 described with reference to FIG. 7.

The sensing unit 820 may also be implemented in combination of at least two of the camera 310, the radar 320, the LiDAR 330, the ultrasonic sensor 340 and the infrared sensor 350 provided in the object detecting apparatus 300, the sensing unit 120 and the input unit 210 (or the audio input module 211).

The sensing unit 820 may sense an object existing in the vicinity of the vehicle 100 and sense information related to the object.

For example, the object may include other vehicles, people, objects, terrains, and the like which exist near the vehicle 100.

The sensing unit 820 may sense information related to the vehicle 100 of the present invention.

The information related to the vehicle may be at least one of vehicle information (or a driving status of the vehicle) and surrounding information related to the vehicle.

For example, the vehicle information may include at least one of a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user is present in the vehicle, a status of the user present in the vehicle, and information associated with the user (for example, whether or not the user is an authenticated user), and the like.

The surrounding information of the vehicle may be a state of a road surface on which the vehicle is traveling (e.g., a frictional force, presence or absence of a pothole, a type of road surface, etc.), the weather, a distance from a front-side (rear-side) vehicle, a relative speed of a front-side (rear-side) vehicle, location information related to another vehicle, location information related to an object, a curvature of a curve when a driving lane is the curve, ambient brightness of the vehicle, information associated with an object existing in a reference region (predetermined region) based on the vehicle, whether or not an object enters (or leaves) the predetermined region, whether or not the user exists near the vehicle, information associated with the user (for example, whether or not the user is an authenticated user), and the like.

The surrounding information (or surrounding environment information) of the vehicle may include external information related to the vehicle (e.g., ambient brightness, temperature, a position of the sun, information related to nearby subject (a person, another vehicle, a sign, etc.), a type of a driving road surface, a landmark, line information, and driving lane information), and information required for an autonomous driving/autonomous parking/automatic parking/manual parking mode.

In addition, the surrounding information of the vehicle may further include a distance from an object existing around the vehicle to the vehicle 100, a time required for the vehicle to reach the object, a type of the object, a parking space for the vehicle, an object for identifying the parking space (for example, a parking line, a string, another vehicle, a wall, etc.), and the like.

Also, the sensing unit 820 may sense at least one of a state of a driver in the vehicle or a state of a passenger in the vehicle. The state of the driver aboard the vehicle or the state of the passenger aboard the vehicle may be sensed through at least one of the internal camera 220 or the biometric sensing unit 230 included in the sensing unit 820.

The sensing unit 820 may include at least one of the internal camera 220 or the biometric sensing unit 230. The sensing unit 820 may sense the state of the driver or the passenger based on at least one of the image received through the internal camera 220 or biometric information related to the driver (or the passenger) acquired through the biometric sensing unit 230.

Hereinafter, for the sake of explanation, one example in which the sensing unit 820 is provided separately in the vehicle control device 800 will be described. That the processor 870 acquires any information through the sensing unit 820 may be understood as the processor acquires any information using at least one of the object detecting apparatus 300 provided in the vehicle 100, the sensing unit 120 provided in the vehicle 100, the internal camera 220 provided in the vehicle 100, or the biometric sensing unit 230 provided in the vehicle 100.

Meanwhile, the vehicle control device 800 of the present invention may include the processor 870 for controlling the camera 810, the sensing unit 820, and the like.

The processor 870 may be the controller 170 described in FIG. 7.

The processor 870 may control the components described in FIG. 7 and the components described in FIG. 8.

The processor 870 may decide a first time required for the vehicle currently driven in the autonomous driving mode to reach a point where the vehicle is to be switched to the manual driving mode. In one example, the processor 870 may decide the first time based on an image received through the camera 810.

In addition, the processor 80 may sense a driver's state through the sensing unit 820. The processor 870 may also decide a second time required for the driver to be ready to perform manual driving based on the driver's state.

Thereafter, the processor 870 may output notification information based on the first time and the second time. Specifically, the processor 870 may output the notification information such that the second time is shortened when the second time is longer than the first time. The notification information may be output through the output unit 250 (e.g., at least one of the display module 251, the audio output module 252, or the haptic output module 253).

Hereinafter, description will be given in more detail of an optimized method capable of fully preparing a driver for manual driving before entering a section in which a vehicle of the present invention is to be driven in a manual driving mode, with reference to the accompanying drawings.

Figure 9:
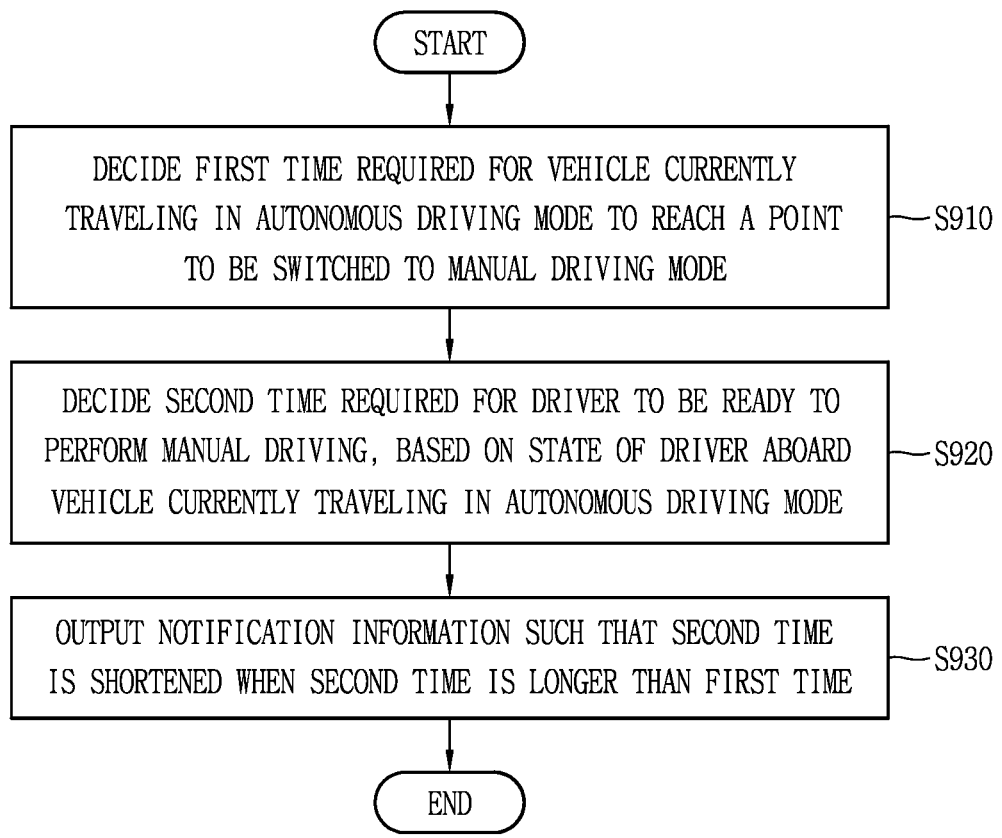
FIG. 9 is a flowchart illustrating a typical control method of the present invention.
Figure 10A:
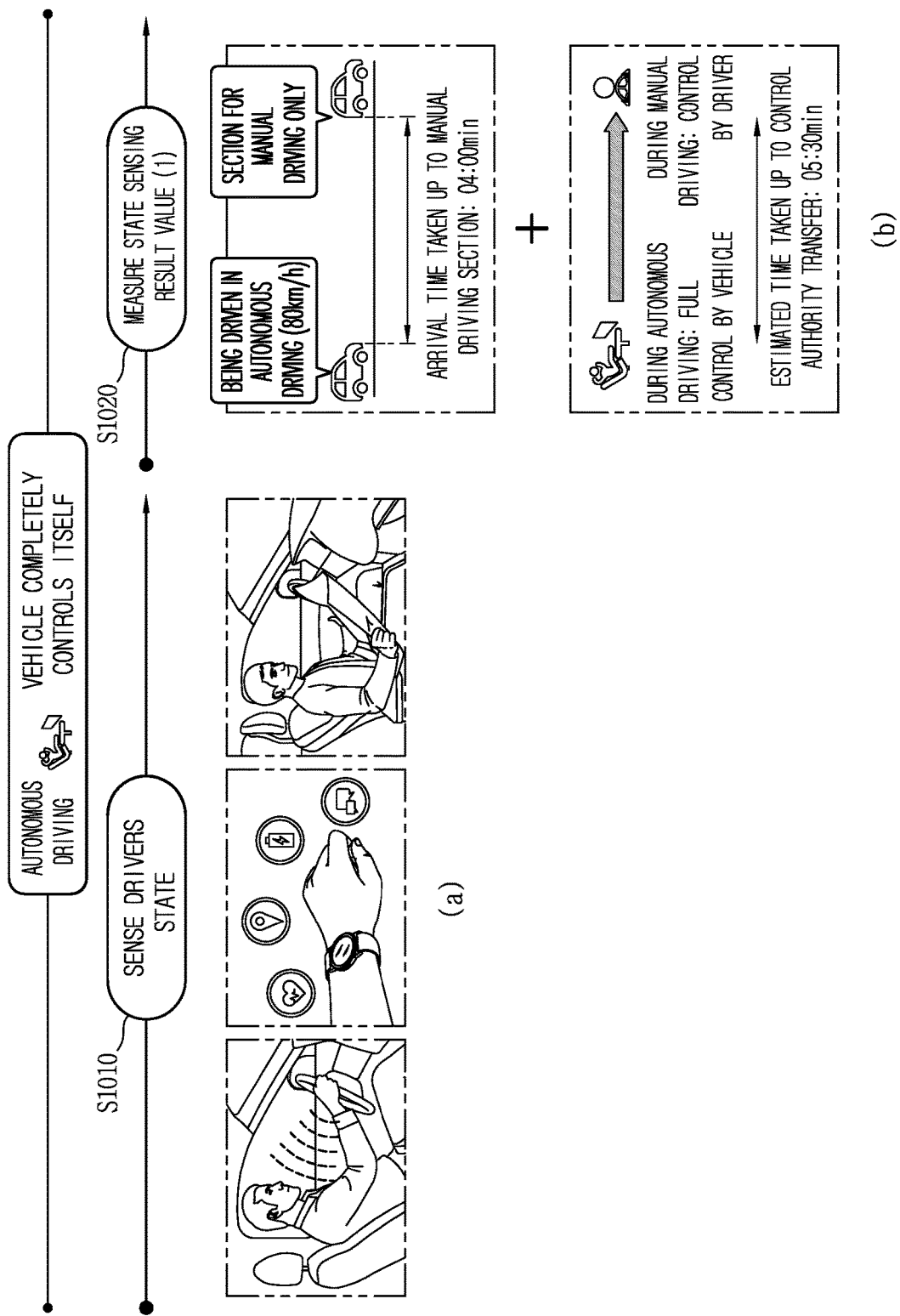
FIGS. 10A, 10B, and 10C are conceptual views illustrating the control method illustrated in FIG. 9.
Figure 10B:
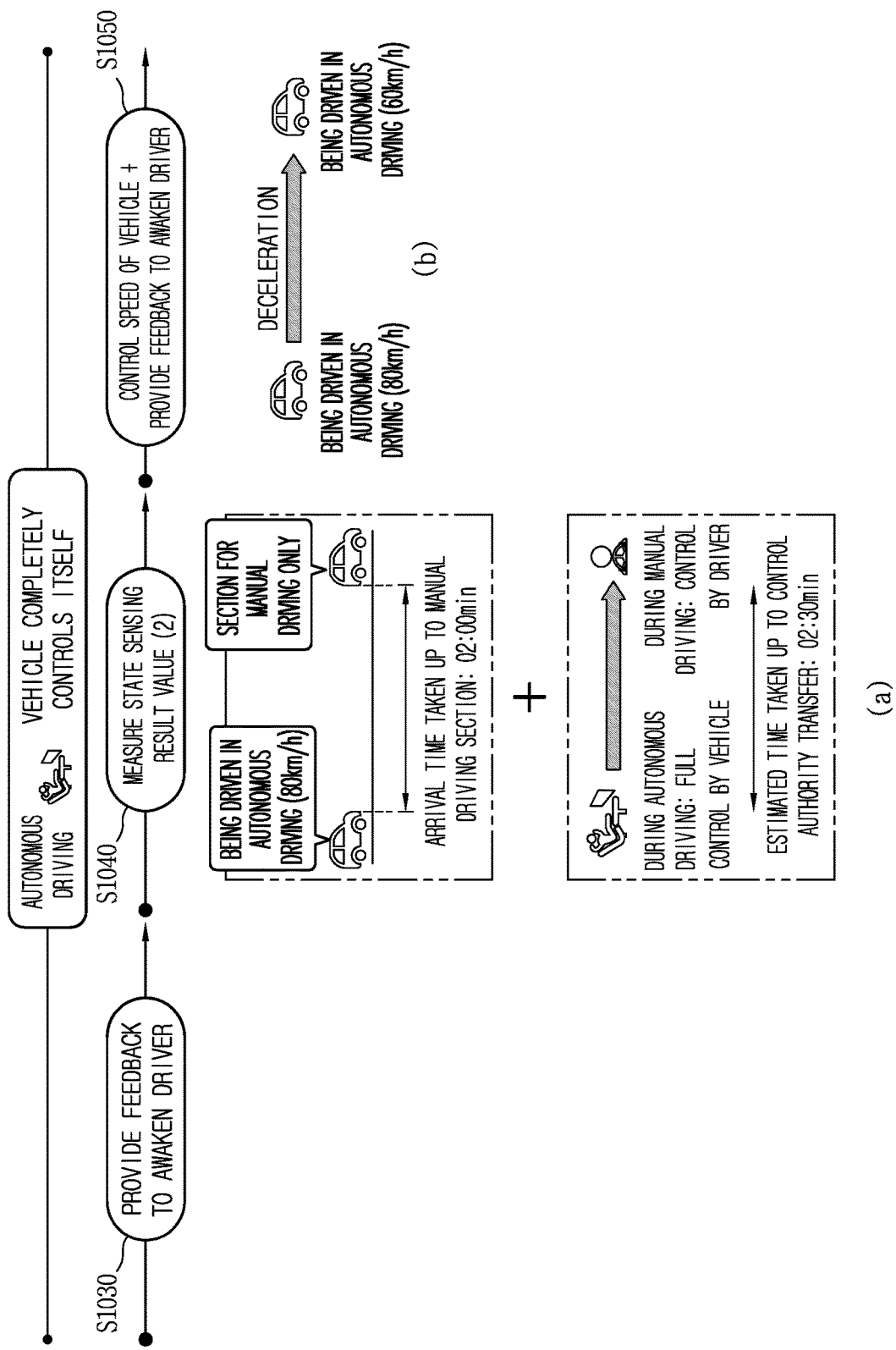
Figure 10C:
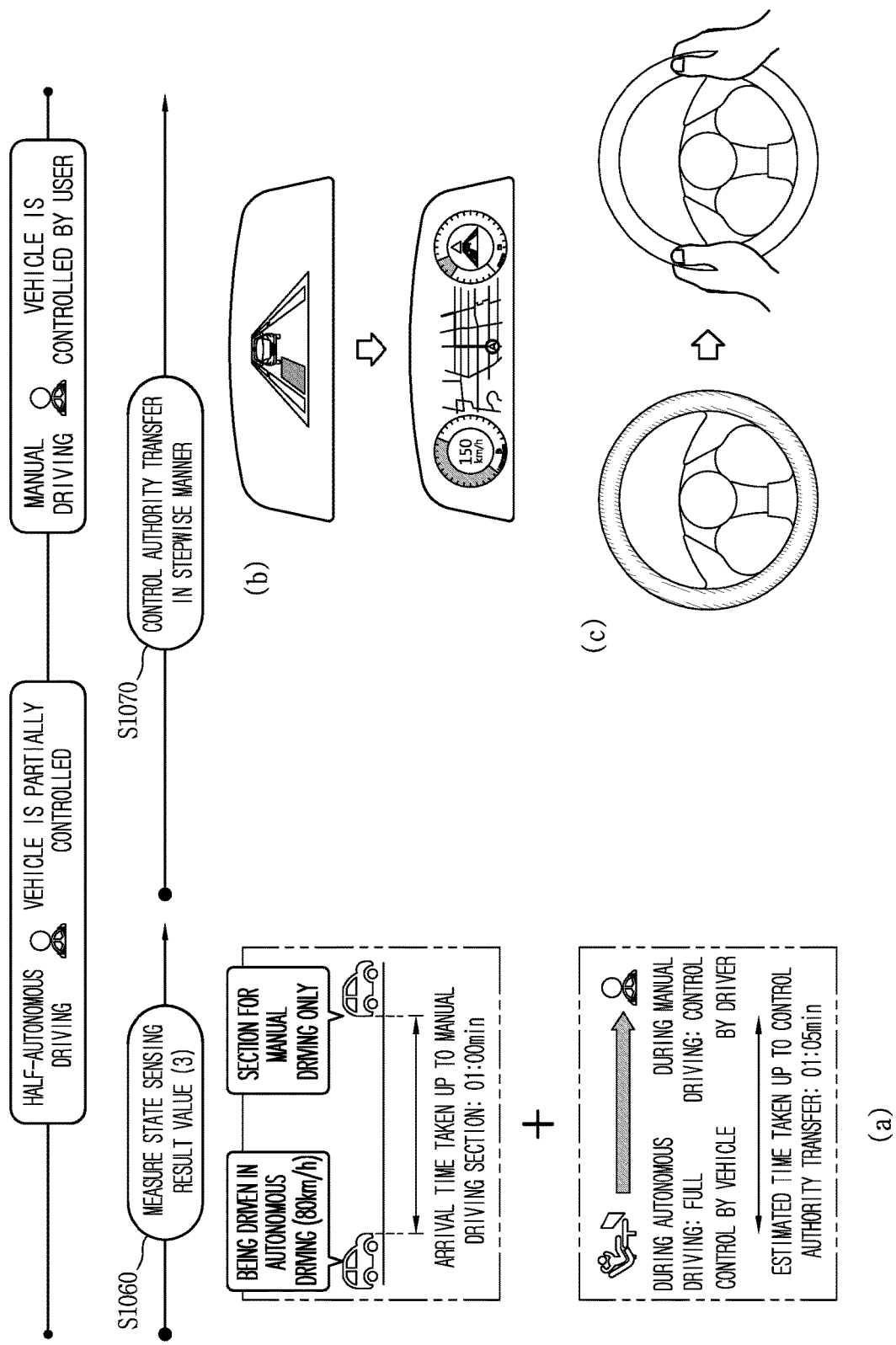

FIG. 9 is a flowchart illustrating a typical control method according to the present invention, and FIGS. 10A, 10B and 10C are conceptual views illustrating the control method illustrated in FIG. 9.

Referring to FIG. 9, in the present invention, a first time required for the vehicle 100 currently traveling in an autonomous driving mode to reach a point where the vehicle 100 is to be switched to a manual driving mode is decided (S910).

Specifically, the vehicle 100 may travel in a section capable of traveling in the autonomous driving mode and in a section traveling in the manual driving mode. At this time, in the section capable of traveling in the autonomous driving mode, the vehicle 100 may travel in the autonomous driving mode.

When the vehicle 100 approaches the section to be driven in the manual driving mode, the processor 870 may decide a first time required for the vehicle to reach a point where the vehicle is to be switched to the manual driving mode.

In detail, the processor 870 may decide the point at which the driving mode of the vehicle is to be switched to the manual driving mode. The point where the driving mode of the vehicle is to be switched to the manual driving mode may refer to a starting point of a section in which the vehicle is to be driven in the manual driving mode or a starting point of a section (road) set for the vehicle to be driven in the manual driving mode.

For example, the processor 870 may decide, based on an image received through the camera 810, the point where the driving mode of the vehicle is to be switched to the manual driving mode. Specifically, when a signboard (or information drawn on the road) indicating the point at which the driving mode is to be switched to the manual driving mode is sensed, the processor 870 may decide (determine, extract, detect, sense) the point where the driving mode is to be switched to the manual driving mode, on the basis of a point at which the signboard is located.

For example, the processor 870 may decide the location of the signboard as the point where the driving mode is to be switched to the manual driving mode, or decide a point spaced by a predetermined distance from the location of the signboard as the point where the driving mode is to be switched to the manual driving mode.

As another example, the processor 870 may decide the point to switch the driving mode into the manual driving mode (i.e., the starting point of the section in which the vehicle is to be driven in the manual driving mode), by one or a combination of at least two of the camera 810, the radar 320, the LiDAR 330, the ultrasonic sensor 340, or the infrared sensor 350.

In addition, the processor 870 may decide the point to start the driving in the manual driving mode (the starting point of the section in which the vehicle is to be driven in the manual driving mode), on the basis of at least one of map information prestored in the memory 140 or information received through the communication device 400 (e.g., map information or information related to a driving road).

The map information or the information received through the communication device 400 may include location information related to the point at which the vehicle 100 is to be switched into the manual driving mode on a current driving road. The processor 870 may decide the location information related to the point to switch the driving mode into the manual driving mode, on the basis of the location information.

When an object (e.g., a signboard or guidance information drawn on a road) indicating the point at which the vehicle is to travel in the manual driving mode is detected on the image received through the camera 810, the processor 870 may decide a distance between the object and the vehicle 100. Here, the distance between the object and the vehicle 100 may refer to a distance between the point (starting point) to drive the vehicle in the manual driving mode and the vehicle 100.

In addition, the processor 870 may decide a distance between the vehicle 100 and the point to switch the driving mode into the manual driving mode, on the basis of the location information related to the vehicle 100 and the location information related to the point to switch the driving mode into the manual driving mode, included in the map information prestored in the memory (or the information received through the communication device).

Thereafter, the processor 870 may decide (determine, extract, detect, sense, calculate) a first time required to reach the point at which the vehicle currently traveling in the autonomous driving mode is to be switched into the manual driving mode, on the basis of a driving speed of the vehicle 100 and the distance between the point (starting point) to drive the vehicle in the manual driving mode and the vehicle 100.

The first time may refer to a time (or a remaining time) taken by the vehicle 100 to reach the point where the vehicle is to be driven in the manual driving mode.

The first time extends as the distance between the point (starting point) to drive the vehicle in the manual driving mode and the vehicle 100 increases and the driving speed of the vehicle 100 is slowed down.

Thereafter, in the present invention, a second time required for the driver to be ready to perform manual driving is decided based on a state of the driver aboard the vehicle which is currently driven in the autonomous driving mode (S920).

Referring to (a) of FIG. 10A, a current state of the driver may be detected (S1010). For example, the processor 870 may recognize (determine) a current state of the driver (the driver's state) at a preset period (or always) or when a preset condition is satisfied. The preset condition is an associated condition for recognizing the driver's state. For example, the preset condition may include a case where a remaining distance up to the point to switch the driving mode of the vehicle 100 into the manual driving mode or the first time required for the vehicle to reach the point to switch the driving mode into the manual driving mode is within a predetermined distance or a predetermined time, or a case where a specific event is generated (e.g., when an accident occurs on a road, when a road is under construction, a change in weather, etc.).

Specifically, the processor 870 may sense the state of the driver aboard the vehicle 100 through the sensing unit 820. The state of the driver may include a gaze, a behavior or motion, a terminal, a posture and the like, associated with the driver aboard the vehicle 100 currently traveling in the autonomous driving mode.

The processor 870 may sense at least one of the driver's gaze, the driver's behavior or motion, the driver's terminal, and the driver's posture based on the image received through the internal camera 220 included in the sensing unit 820.

For example, the processor 870 may determine whether the driver is looking forward, looking downward, sleeping, or the like, based on the sensed driver's gaze.

In another example, the processor 870 may determine, based on the sensed driver's behavior or motion, whether the driver is viewing a book, watching a movie, holding a steering wheel, sleeping, or the like.

As another example, the processor 870 may decide the terminal that the driver is using through the sensing unit 820. For example, the terminal currently used by the driver may include a lap-top, a mobile terminal (smart phone, wearable terminal), a display module 251 (e.g., CID, Cluster, etc.) equipped in the vehicle.

At this time, the processor 870 may also decide the terminal currently used by the driver through the communication device 400 when the communication device 400 of the vehicle and the terminal are connected to perform communication with each other.

As another example, the processor 870 may determine whether the driver is lying his/her face down, sitting or lying down, whether the driver is posing a lean-back posture with moving a seat of the vehicle back, whether the driver is watching the display within the vehicle, on the basis of the sensed driver's posture.

Meanwhile, the processor 870 may sense the driver's state through a wearable terminal worn by the driver. For example, when the communication device 400 of the vehicle 100 and the wearable terminal worn by the driver are connected to perform communication therebetween, and biometric information related to the driver is acquired through the wearable terminal, the processor 870 may receive the biometric information, which is received through the wearable terminal, through the communication device 400. Thereafter, the processor 870 may determine a health condition of the driver based on the biometric information.

The driver's health condition is included in the driver's state. The health condition of the driver may be determined by the processor based on the biometric information obtained through the biometric sensing unit 230 included in the sensing unit 820.

In addition, the processor 870 may decide the driver's schedule, based on prestored driver's schedule information, or schedule information stored in the driver's mobile terminal connected to the vehicle 100 for communication. The driver's schedule may be included in the driver's state.

The present invention may prestore therein the second time required for the driver to be ready to perform manual driving for each of the various driver's states, or may receive the second time from an external device (or an external server) for each of the various driver's states.

Information related to the second time for each state of the driver may be stored in the memory 140 or received from an external device (external server).

The processor 870 may decide the second time required for the driver to be ready to perform manual driving, based on the driver's state sensed through the sensing unit 820. Specifically, the second time required for the driver to be ready to perform the manual driving may be a time required until the driver is completely ready to perform the manual driving.

The second time refers to a time (preparation time) required for the driver to perform the manual driving, and thus may have a meaning of a kind of prediction time. The second time may be referred to as a manual driving preparation completion time according to the driver's state.

For example, the second time may be decided based on time information required until the driver is ready to perform the manual driving according to each state of the driver prestored in the memory (i.e., manual driving preparation completion time information for each state of the driver). For example, the memory 140 of the vehicle may store therein information related to the time, which is required for the driver to be ready to perform the manual driving for each state of the driver, in a table format.

On the other hand, the second time required for the driver to be ready to perform the manual driving according to the driver's state (i.e., the manual driving preparation completion time according to the driver's state) may differ based on the driver's age, the driver's driving experience, and the like, even in the same driver state (e.g., in a sleep state of the driver, etc.).

For example, the processor 870 may collect driver data when the driver drives the vehicle in the manual driving mode. The driver data may include, for example, driving skill, reaction speed, coping ability in situations, usual motor nerves, and the like.

The driving skill may be data of various driving abilities associated with the manual driving of the vehicle, such as stopping/parking, lane keeping, maintaining a distance from the preceding vehicle, and observing speed.

The reaction speed may be decided based on the time taken until the driver is ready to perform the manual driving when the autonomous driving mode has been switched to the manual driving mode.

The coping ability in situations may be decided based on an average of speed data that the driver copes with an emergency (e.g., a sudden lane change of another vehicle, an accident near the vehicle, an approach of an emergency vehicle, a sudden weather change, etc.).

The normal motor nerves may be measured by the wearable terminal worn by the driver, and the processor 870 may receive information on the normal motor nerves from the wearable terminal.

The processor 870 may update (modify, correct) the second time required for the driver to be ready to perform the manual driving for each driver state (i.e., the manual driving preparation completion time information for each driver state), according to a user setting or by reflecting the driver data.

On the other hand, the second time required for the driver to be ready to perform the manual driving for each driver state (i.e., the manual driving preparation completion time information for each driver state) may further be updated (modified, corrected) by a test preset in the vehicle.

For example, the processor 870 may decide the second time required for the driver to be ready to perform the manual driving or update (modify, correct) the time information stored in the memory, in a manner of performing a preset test.

The preset test, for example, may be performed when it is difficult to recognize the state of the driver, when it is necessary to update the manual driving preparation completion time for each driver state, stored in the memory 140, and the like.

That is, the processor 870 may decide (or predict) the second time required for the driver to be ready to perform the manual driving, on the basis of the driver's state sensed through the sensing unit 820.

Returning back to FIG. 9, in the present invention, when the second time is longer than the first time, notification information is output so that the second time is shortened (S930).

The processor 870 may output the notification information such that the second time is shortened, when the second time required for the driver to be ready to perform the manual driving is longer than the first time required for the vehicle to reach the point at which the vehicle currently traveling in the autonomous driving mode is to be switched into the manual driving mode.

In detail, the first time is the time required for the vehicle to reach the point at which the driving mode of the vehicle is to be switched to the manual driving mode, and the second time is the time required for the driver to be ready to perform the manual driving.

Referring to (b) of FIG. 10A, in the present invention, the first time required for the vehicle to reach the point at which the vehicle currently traveling in the autonomous driving mode is to be switched to the manual driving mode, and the second time required for the driver to be ready to perform the manual driving may be measured and compared (S1020). The measurement and comparison may be performed by the processor 870.

When the second time is longer than the first time, it indicates that the driver is not ready to perform the manual driving until the vehicle reaches the point.

For example, the first time required for the vehicle to reach the point where the vehicle currently traveling in the autonomous driving mode is to be switched into the manual driving mode, as illustrated in (b) of FIG. 10A, may be an arrival time that the vehicle reaches a manual driving section.

Also, the second time required for the driver to be ready to perform the manual driving, as illustrated in (b) of FIG. 10A, may be an estimated time taken until a control authority transfer. Here, the control authority transfer may refer to that a driving authority (i.e., control authority) of the vehicle is transferred to the driver from the perspective of the vehicle, which means that the driving mode of the vehicle is eventually switched from the autonomous driving mode to the manual driving mode.

That is, the estimated time taken until the control authority transfer may indicate the second time required for the driver to be ready to perform the manual driving, from the driver's perspective (i.e., the second time required for the driver to complete the preparation to perform the manual driving).

As illustrated in (b) of FIG. 10A, the second time (5 minutes and 30 seconds) required for the driver to be ready to perform the manual driving may be longer than the first time (4 minutes) required for the vehicle to reach the point where the vehicle currently traveling in the autonomous driving mode is to be switched to the manual driving mode.

That is, when the second time is longer than the first time, it may indicate that the driver's preparation to perform the manual driving takes a longer time than the vehicle reaching the point to switch the driving mode into the manual driving mode.

In this case, even when the vehicle enters the section where the vehicle is to be driven in the manual driving mode, the vehicle should be driven in the autonomous driving mode, which may increase the risk of accidents. Generally, the section that the vehicle is to be driven in the manual driving mode may indicate a section having a terrain, a road condition, and a surrounding environment in which the vehicle is difficult or unable to be driven in the autonomous driving mode. Accordingly, when the vehicle is driven in the autonomous driving mode in the section where it is to be driven in the manual driving mode, the risk of accidents increases.

In order to prevent this, the second time required for the driver to be ready to perform the manual driving should be shorter than the first time required for the vehicle to reach the point to switch the driving mode into the manual driving mode.

To this end, the processor 870 of the vehicle control device 800 of the present invention may output notification information such that the second time becomes shorter than the first time. That is, since the second time is the time required until the driver is ready to perform the manual driving, the processor 870 of the present invention may output the notification information (feedback) such that the driver can perform the manual driving faster.

In detail, when the second time is longer than the first time, the processor 870 may output the notification information, such that the second time (i.e., the time required for the driver to complete the preparation for the manual driving) can be shorter than the first time (i.e., the time required for the vehicle to reach the section to be driven in the manual driving mode). The notification information plays a role of providing feedback so that the driver can complete the preparation for the manual driving more quickly.

That is, the processor 870 may output the notification information such that the second time can be shorter than the first time when the second time is longer than the first time. At this time, the processor 870 may continuously output the notification information until the second time becomes shorter than the first time.

Referring to FIG. 10B, a feedback is provided to awaken the driver to perform the manual driving more quickly (S1030). That is, the step S1030 may be understood as a step of outputting the notification information such that the second time is shortened when the second time is longer than the first time.

The processor 870, for example, may output the notification information such that the second time can be shorter than the first time when the second time is longer than the first time. In detail, the processor 870 may output the notification information until the second time becomes shorter than the first time.

As another example, the processor 870 may differently control a degree of outputting the notification information according to a difference between the first time and the second time when the second time is longer than the first time. For example, the processor 870 may more increase the degree of outputting the notification information as the difference between the first time and the second time is larger. That is, the degree of outputting the notification information may be proportional to the time difference between the first time and the second time.

The notification information may be output in at least one form of sound, information (image, video, graphic object, etc.) output on the display unit, vibration, a change of an interior of the vehicle, or a turn-on of an indoor lamp of the vehicle. In addition, the notification information for shortening the second time required for the driver to be ready to perform the manual driving may be output in various forms.

When the notification information is the sound, increasing the degree of outputting the notification information may correspond to increasing a volume of the sound.

When the notification information is the information output on the display unit, increasing the degree of outputting the notification information may correspond to enlarging an output size of the information.

When the notification information is the vibration, increasing the degree of outputting the notification information may correspond to increasing intensity of the vibration.

When the notification information is the change of the interior within the vehicle, increasing the degree of outputting the notification information may correspond to speeding up the change of the interior of the vehicle.

When the notification information is the turn-on of the indoor lamp of the vehicle, increasing the degree of outputting the notification information may correspond to increasing brightness of a turned-on indoor lamp of the vehicle.

In order to awaken the driver to a prepared state for performing the manual driving more quickly as the second time is longer than the first time and the time difference between the first time and the second time is greater, the degree of outputting the notification information can be increased.

Meanwhile, the notification information of the present invention may be output in various forms.

For example, the processor 870 may output preset screen information (e.g., a warning icon, information indicating the first time) on the display module 251 (e.g., a cluster, a head up display (HUD), an E-mirror, a CID, etc.) provided within the terminal, or may cause the display module 251 to emit light in a preset manner. In this case, the preset manner may include a method of outputting light of a specific color with a specific brightness or a pattern of emitting light.

As another example, the processor 870 may output preset screen information on a terminal (e.g., a mobile terminal or a wearable terminal) belonging to the driver or a terminal that the driver is watching, or may cause the display unit of the terminal to emit light in a preset manner.

As another example, the processor 870 may output the notification information in a form of changing the interior (e.g., a seat position, a seat posture, a seat arrangement, a steering wheel, an accelerator pedal, a brake pedal, etc.) of the vehicle. For example, the processor 870 may change the interior of the vehicle so that the driver can perform the manual driving in the manual driving mode. Changing the interior of the vehicle may be an embodiment of outputting the notification information.

As another example, the processor 870 may output the notification information in a form of outputting a preset sound (e.g., a warning sound, a sound specified by the driver, etc.) through the audio output module 252 of the vehicle or a terminal belonging to the driver.

In this manner, according to the present invention, the notification information can be output in various forms, such that the second time (the time required for the driver to be ready to perform the manual driving) can be more effectively shortened when the second time is longer than the first time (the time required for the vehicle to reach the point to switch the driving mode of the vehicle to the manual driving mode.

Further, the present invention can provide a new vehicle control method, capable of providing a feedback such that the second time required for the driver to be ready to perform the manual driving can be shortened so as to complete the preparation for the driver's manual driving before entering the point at which the vehicle currently traveling in the autonomous driving mode should be switched to the manual driving mode, when the first time required for the vehicle to enter the point is shorter than the second time (in other words, when the second time is longer than the first time).

Meanwhile, as illustrated in (a) of FIG. 10B, the first time and the second time may be measured again after outputting the notification information (feedback) (S1040).

Specifically, the processor 870 may re-decide (re-calculate) the second time required for the driver to be ready to perform the manual driving after outputting the notification information. In addition, the processor 870 may re-decide (re-calculate) the first time required for the vehicle currently traveling in the autonomous driving mode to be switched to the manual driving mode.

The processor 870 may determine whether to output the notification information based on the re-decided second time and first time.

For example, as illustrated in (a) of FIG. 10B, when the second time (2 minutes and 30 seconds) is still longer than the first time (2 minutes) according to a comparison of the re-decided first time (2 minutes) with the re-decided second time (2 minutes and 30 seconds) after the output of the notification information, the processor 870 may output the notification information continuously (or until the second time becomes shorter than the first time).

On the other hand, although not illustrated, the processor 870 may not output the notification information when the second time becomes shorter than the first time.

Meanwhile, when the second time is longer than the first time, the processor 870 may decelerate the vehicle 100 traveling in the autonomous driving mode so that the first time can extend.

For example, as illustrated in (b) of FIG. 10B, when the second time (the time required for the driver to be ready to perform the manual driving) is longer than the first time (the time required for the vehicle currently traveling in the autonomous driving mode to start driving in the manual driving mode), the speed of the vehicle may be controlled and notification information may be provided to the driver (S1050).

For example, as illustrated in (b) of FIG. 10B, the processor 870 may reduce the speed of the vehicle that is traveling in the autonomous mode when the second time is longer than the first time. In this case, the first time extends.

As such, the present invention can provide the new control method, capable of allowing the driver to be in the state of performing the manual driving before arriving at the point to drive the vehicle in the manual driving mode, by extending the first time in the manner of reducing the driving speed of the vehicle, when the second time (the time for which the driver is completely ready to perform the manual driving) is longer than the first time (the time at which the vehicle arrives at the point where the vehicle is to be driven in the manual driving mode).

On the other hand, as illustrated in (a) of FIG. 10C, a time difference between the first time (the time required for the vehicle traveling in the autonomous driving mode to reach the point to be driven in the manual driving mode) (1 minute) and the second time (the time required for the driver to be ready to perform the manual driving) (1 minute and 5 seconds) may be within a predetermined time (for example, 10 seconds) (S1060).

At this time, the processor 870 may switch the driving mode of the vehicle from the autonomous driving mode to the manual driving mode based on the fact that the difference between the first time and the second time is within the predetermined time.

Preferably, the processor 870 may switch the autonomous driving mode to the manual driving mode (i.e., transfer the control authority to allow the manual driving), based on the fact that the driver is in the state of being capable of performing the manual driving before the first time arrives (i.e., before the vehicle reaches the point to be driven in the manual driving mode).

However, switching from the autonomous driving mode to the manual driving mode of the present invention may be performed step by step according to preset steps. That is, the switching from the autonomous driving mode to the manual driving mode is performed in a stepwise manner according to preset steps, and thus it may be performed for a predetermined time.

Accordingly, the processor 870 may switch the driving mode of the vehicle from the autonomous driving mode to the manual driving mode based on that the difference between the first time and the second time is within the predetermined time.

For example, as illustrated in (b) and (c) of FIG. 10C, the processor 870 may switch the autonomous driving mode to the manual driving mode in a stepwise manner according to preset steps.

For example, one of the preset steps may be converting screen information output on the display module 251 of the vehicle, as illustrated in (b) of FIG. 10C. The processor 870 may change screen information currently output in the autonomous driving mode to screen information related to the manual driving mode when the switching to the manual driving mode is started.

As another example, one of the preset steps may be changing the interior of the vehicle. The processor 870 may change at least one of a seat position, a seat posture, a position of a steering wheel, an acceleration pedal, a brake pedal, a mirror position, or a position of the display module when the switching to the manual travel mode is started. At this time, the processor 870 may change the interior of the vehicle so as to enable manual driving (or to be the position that was disposed in the manual driving mode).

As another example, one of the preset steps may be transferring a steering control authority of the vehicle (for example, a control authority of the steering wheel). For example, the processor 870 may change the steering control authority which has been automatically controlled into a manual mode when it is detected that the driver is holding the steering wheel through the sensing unit 820, or a preset driver gesture (for example, a specific motion made by the driver holding the steering wheel) is applied after holding the steering wheel. That is, the processor 870 may change an autonomous steering control authority to a manual steering control authority so that an operation related to steering of the vehicle can be performed manually.

As another example, one of the preset steps may be transferring a braking control authority of the vehicle (for example, the control authority for the accelerator and the brake). For example, when a state that the driver puts a foot on the acceleration pedal (or the brake pedal) is detected through the sensing unit 820 for a predetermined period of time, the processor 870 may change an automatic braking control authority to a manual braking control authority. That is, the processor 870 may change the autonomic braking control authority to the manual braking control authority so that an operation related to braking of the vehicle can be performed manually.

With such a configuration, the present invention can provide a control method capable of changing the driving mode of the vehicle more safely by changing the autonomous driving mode to the manual driving mode in the stepwise manner.

The steps S1010 to S1070 described in FIGS. 10A to 10C are merely intended to easily explain a situation that may occur according to a lapse of time, and do not depend on a flow of time or an order of steps. The steps described in FIGS. 10A to 10C may be performed independently.

Meanwhile, the present invention can switch the autonomous driving mode to the manual driving mode in various manners.

FIGS. 11A, 11B, 11C, 12A, 12B, 13, 14, 15 and 16 are conceptual views illustrating various embodiments related to the present invention.

The present invention may consider a passenger on a side of a driver when switching the driving mode of the vehicle from the autonomous driving mode to the manual driving mode.

Figure 11A:
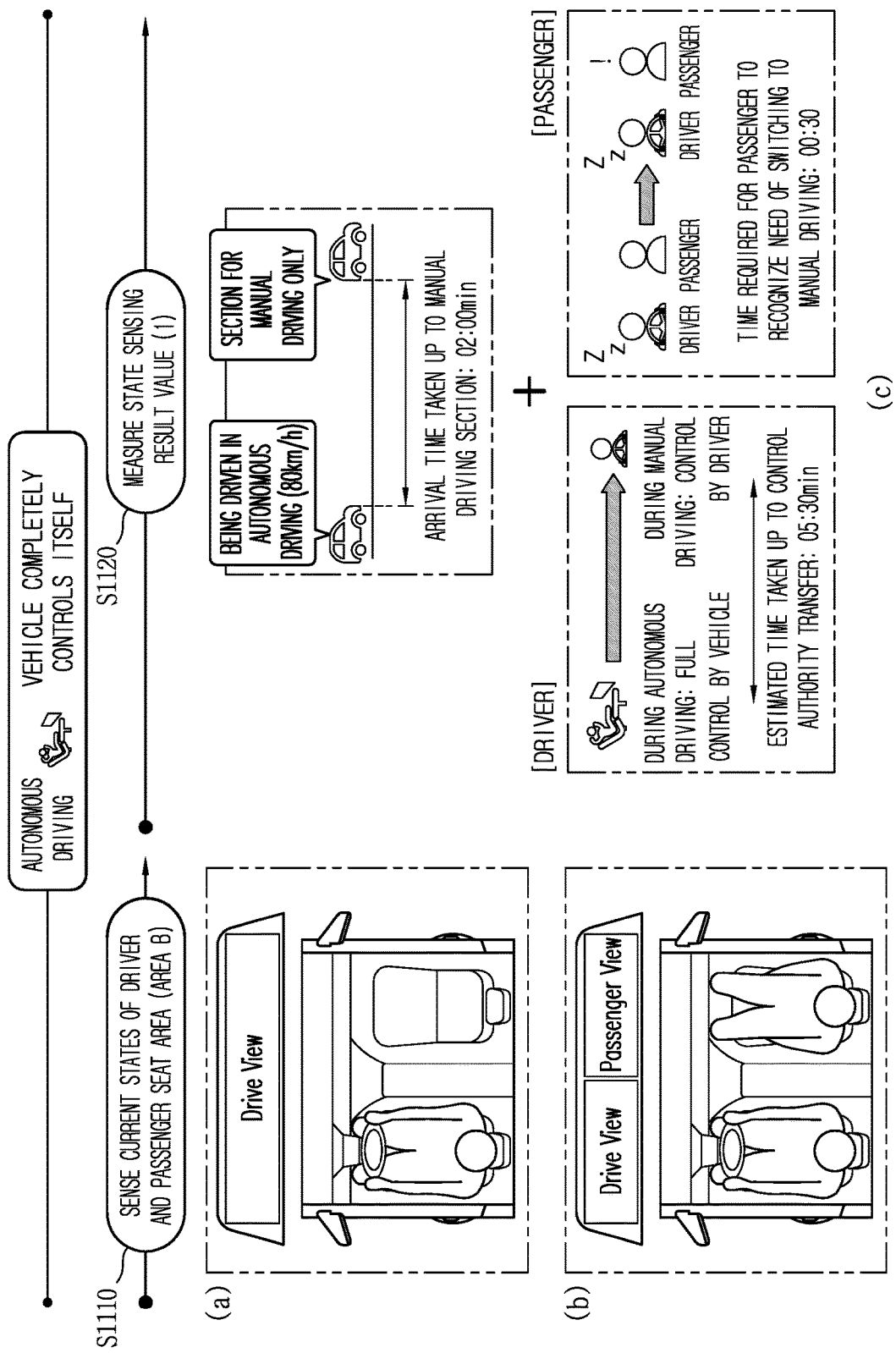
FIGS. 11A, 11B, 11C, 12A, 12B, 13, 14, 15 and 16 are conceptual views illustrating various embodiments related to the present invention.

Referring to (a) and (b) of FIG. 11A, in the present invention, when a passenger is present beside the driver, the driver's state and the passenger's state are sensed (S1110). The way to sense the passenger's state may be the same/like to sensing the driver's state.

The processor 870 may decide a third time required for the passenger present on the side of the driver to be ready to perform manual driving through the sensing unit 820. The way to decide the third time may be the same/like to the way to decide the second time required for the driver to be ready to perform the manual driving.

The third time may also refer to a time that the passenger recognizes the need of switching to manual driving.

Thereafter, the processor 870 may measure and compare the first time required for the vehicle currently traveling in the autonomous driving mode to be driven in the manual driving mode, the second time required for the driver to be ready to perform the manual driving, and the third time required for the passenger to be ready to perform the manual driving (S1120).

For example, as illustrated in (c) of FIG. 11A, there may be a case where the second time (the time for which the driver is completely ready to perform the manual driving) (2 minutes and 30 seconds) is longer than the first time (the time required for reaching the point from which the vehicle is to be driven in the manual driving mode) (2 minutes), and the third time (the time for which the passenger is completely ready to perform the manual driving) (30 seconds) is shorter than the first time (2 minutes).

Figure 11B:
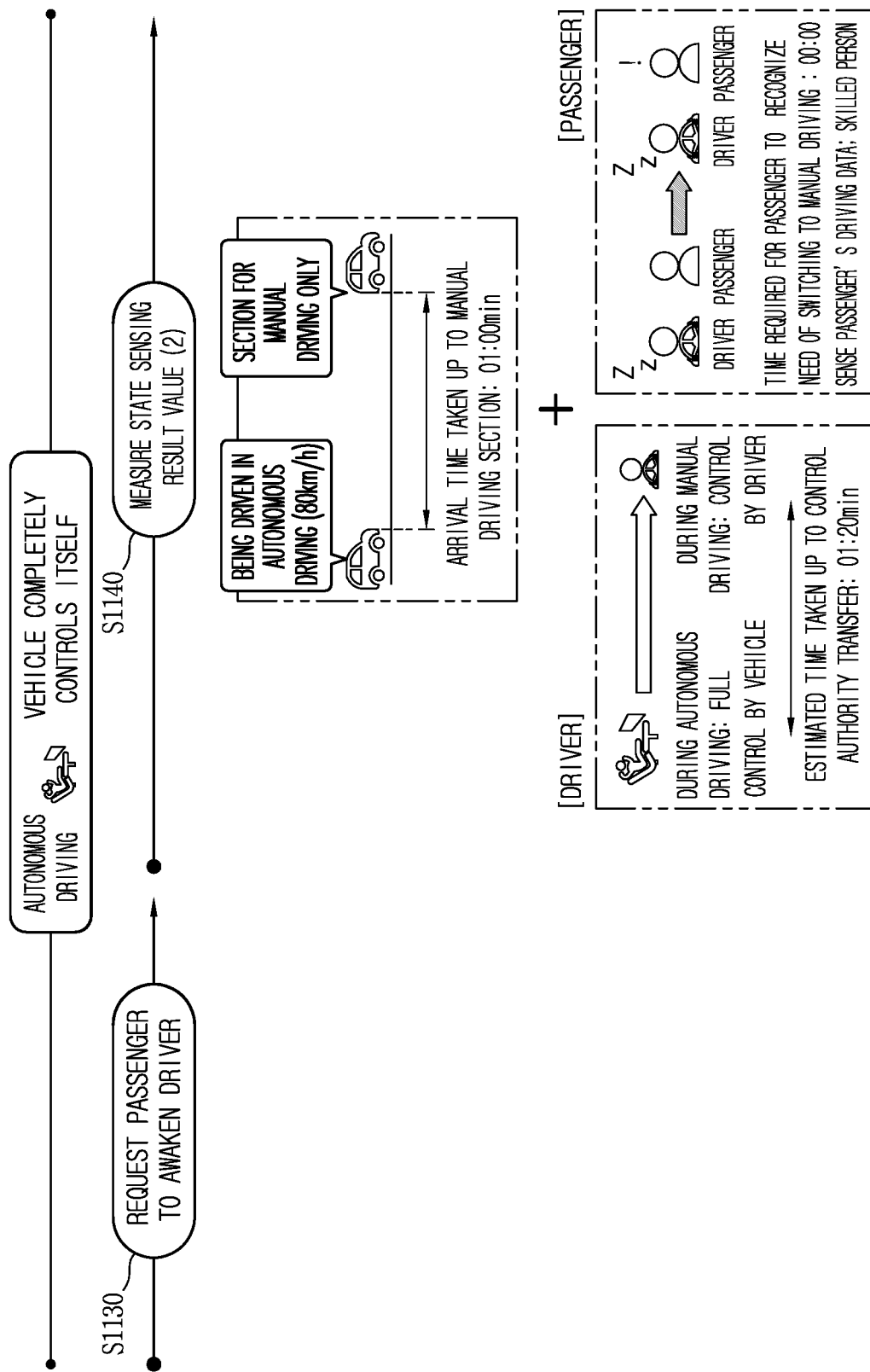

The processor 870 may output notification information to the passenger such that the second time required for the driver to be ready to perform the manual driving can be shortened, when the second time is longer than the first time and the third time is shorter than the first time (S1130 of FIG. 11B).

The notification information output to the passenger may indicate notification information requesting the passenger to prepare for the driver for the manual driving.

For example, the processor 870 may output on the display module 251 of the vehicle the notification information requesting for preparing the driver for performing the manual driving. For example, the display module 251 may be a display disposed on the passenger side.

As another example, the processor 870 may transmit the notification information to a mobile terminal of the passenger to request the passenger to prepare the driver for the manual driving when the mobile terminal of the passenger and the vehicle are connected to perform communication with each other.

As another example, the processor 870 may output, through the audio output module 252 of the vehicle, information requesting to prepare the driver for the manual driving. For example, the processor 870 may output the notification information through an audio output module disposed on an area adjacent to the passenger seat of the audio output module 252 of the vehicle.

The notification information output to the passenger may be continuously output until the second time becomes shorter than the first time. When the second time is shorter than the first time by the help of the passenger, the processor 870 may stop outputting the notification information to the passenger.

On the other hand, in the present invention, as illustrated in FIG. 11B, there may be a case where the second time (1 minute and 20 seconds) is longer than the first time (1 minute) and the third time (0 second, for example, a state that the passenger has been fully ready to perform the manual driving) is shorter than the first time (1 minute) (S1140).

Figure 11C:
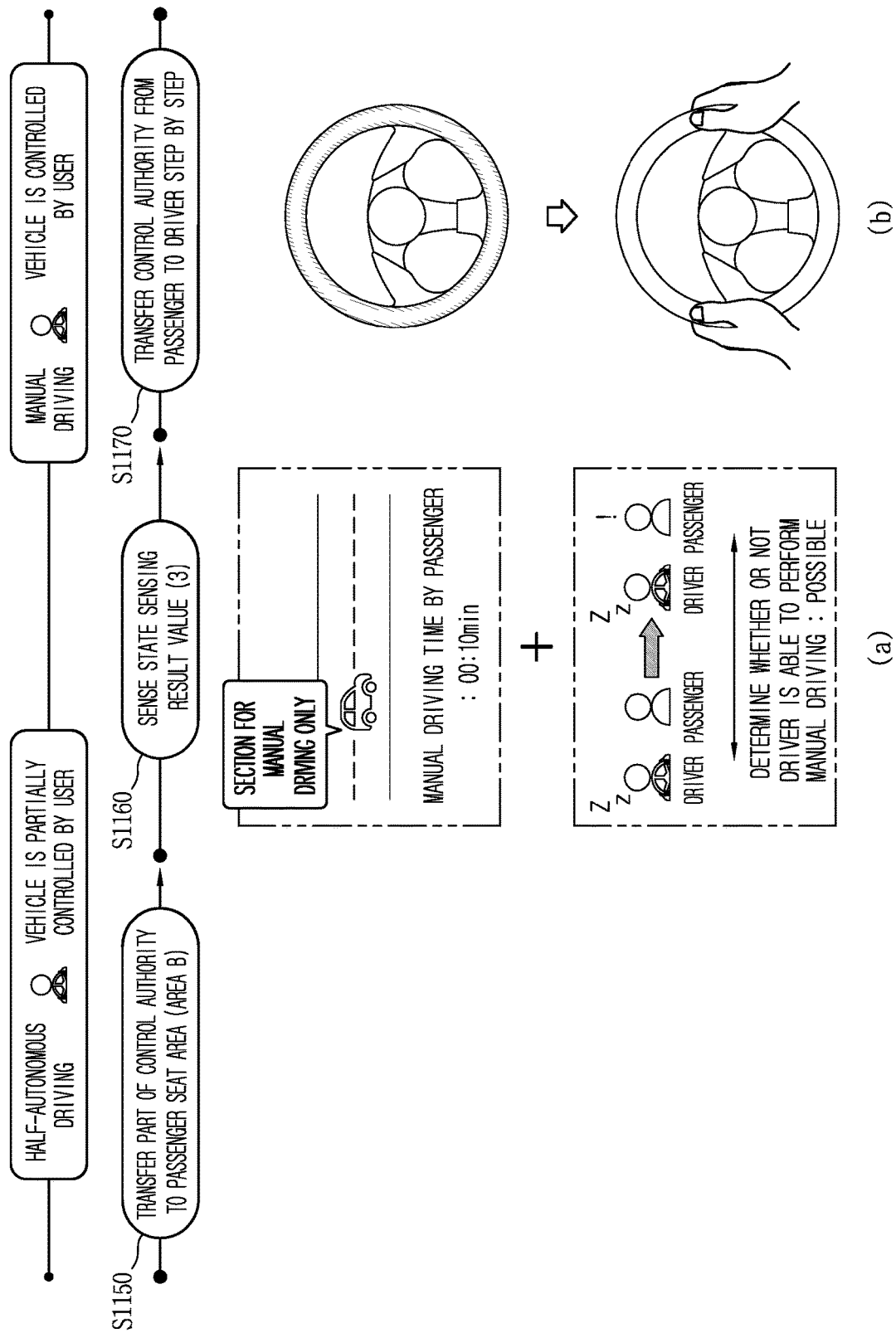

As illustrated in FIG. 11C, when the second time is longer than the first time and the third time is shorter than the first time, the processor 870 may grant a manual driving authority of the vehicle to a driving device provided on the passenger side, based on that the passenger is ready to perform the manual driving (S1150).

The vehicle 100 according to an embodiment of the present invention may be configured such that a driving device (e.g., a steering wheel, an acceleration pedal, a brake pedal, etc.) provided at the driver's seat is movable to the passenger's seat.

As another example, the passenger seat of the vehicle 100 of the present invention may further be provided with a steering wheel, an acceleration pedal, a brake pedal, and the like. The steering wheel, the acceleration pedal, the brake pedal, and the like provided at the passenger seat may be normally located inside the instrument panel.

The processor 870 may grant the manual driving authority of the vehicle to the driving device provided on the passenger side, based on that the passenger is ready to perform the manual driving, when the second time is longer than the first time and the third time is shorter than the first time.

Here, granting the manual driving authority of the vehicle to the driving device provided on the passenger side may refer to that the manual driving of the vehicle is made by the steering wheel, the acceleration pedal, the brake pedal, and the like provided on the passenger side.

When the driving device provided on the passenger side is located inside the instrument panel, the processor 870 may control the driving device to protrude outward. Thereafter, the processor 870 may control the vehicle to be driven manually so as to correspond to a manipulation of the driving device provided on the passenger side.

On the other hand, as illustrated in (a) of FIG. 11C, the vehicle may pass through the point where the vehicle is to be driven in the manual driving mode (10 seconds after passing through the point), and the driver is ready to perform the manual driving (S1160).

In this case, in the state that the vehicle has passed through the point to be driven in the manual driving mode and the passenger is ready to perform the manual driving, when the driver is in a state of being ready to perform the manual driving, the processor 870 may transfer the manual driving authority of the vehicle from the driving device provided on the passenger side to a driving device provided on the driver side (S1170).

That is, transferring (moving) the manual driving authority of the vehicle from the driving device provided on the passenger side to the driving device provided on the driver side may refer to that the driving mode of the vehicle is switched from the autonomous driving mode to the manual driving mode and the manual driving of the vehicle is made by the driving device provided on the driver side.

At this time, the processor 870 may output the notification information indicating that the manual driving authority granted to the driving device provided on the passenger side is moved to the driving device provided on the driver side.

Also, as illustrated in (b) of FIG. 11C, the processor 870 may transfer (change) the manual driving authority of the vehicle from the driving device provided on the passenger side to the driving device provided on the driver side, in response to a reception of a preset driver gesture on the driving device (e.g., the steering wheel) of the driver side.

Further, moving (transferring) the manual driving authority granted to the driving device provided on the passenger side to the driving device provided on the driver side may be made in a stepwise manner according to preset steps.

The preset steps may be understood by equally/similarly applying the aforementioned preset steps.

For example, one of the preset steps may be outputting screen information related to the manual driving mode, which is currently output on the display provided on the passenger side, to the display module provided on the driver side.

As another example, one of the preset steps may be transferring the control authority of the steering wheel provided on the passenger side to the steering wheel provided on the driver side.

As another example, one of the preset steps may be transferring (moving) the control authority of the acceleration pedal and the brake pedal provided on the passenger side to the acceleration pedal and the brake pedal provided on the driver side.

When the manual driving authority of the vehicle is transferred to the driving device provided on the driver side, the processor 870 may control the vehicle to be driven manually so as to correspond to a manipulation of the driving device provided on the driver side.

In addition, when the manual driving authority of the vehicle is transferred to the driving device provided on the driver side, the processor 870 may hide the driving device provide on the passenger side into the instrument panel or ignore (or lock) the operation of the driving device provided on the passenger side.

When the driving device is moved from the driver side to the passenger side, the processor 870 may control the vehicle to travel in the autonomous driving mode only while the driving device provided on the passenger side is moved to the driver side. Thereafter, the processor 870 may switch the autonomous driving mode to the manual driving mode based on a preset gesture of the driver being applied to the driving device moved to the driver side.

As described above, the present invention can provide a vehicle control device, capable of switching a driving mode of the vehicle from an autonomous driving mode to a manual driving mode in an optimized manner in consideration of a passenger in the presence of the passenger, and a method of controlling the vehicle.

Hereinafter, various embodiments of the present invention will be described.

Figure 12A:
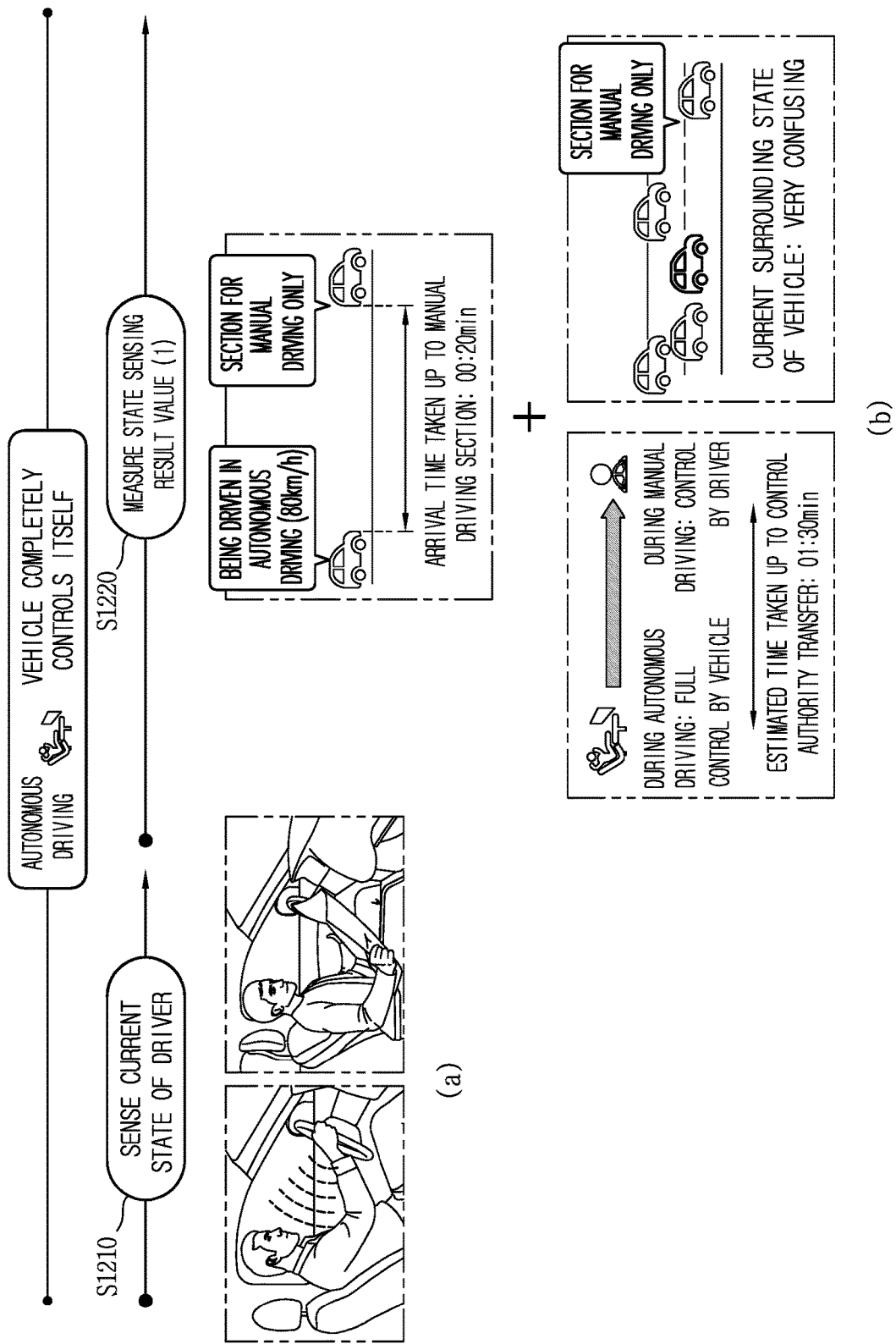

Referring to (a) of FIG. 12A, the processor 870 of the present invention may sense the driver state (S1210). The related content will be understood by the foregoing description.

Thereafter, the processor 870 may decide a first time required for the vehicle currently driven in an autonomous driving mode to reach a point to be driven in a manual driving mode, and a second time required for a driver to be ready to perform manual driving.

The processor 870, as illustrated in (b) of FIG. 12A, the processor 870 may output notification information such that the second time is shortened, when the second time (1 minute and 30 seconds) is longer than the first time (20 seconds) and other vehicles are present within a predetermined distance from the vehicle 100 (or in case of congestion around the vehicle).

At this time, for example, the processor 870 may output notification information indicating the presence of the other vehicles within the predetermined distance in a manner that an output degree of the notification information is stronger than an output degree of notification information indicating an absence of the other vehicles within the predetermined distance.

In addition, the processor 870 may decelerate the vehicle that is traveling in the autonomous driving mode so that the first time extends, as illustrated in (a) of FIG. 12 (S1230).

Figure 12B:
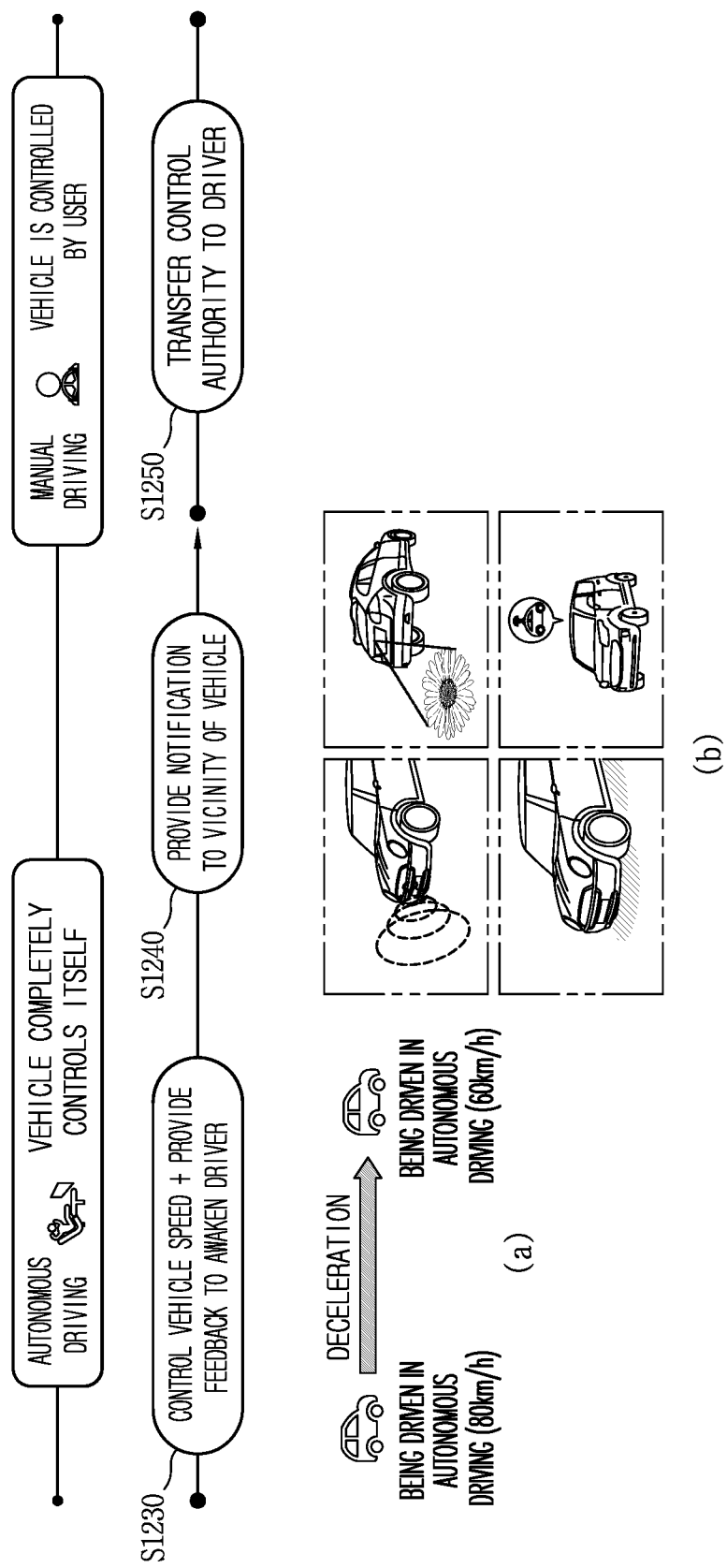

On the other hand, as illustrated in (b) of FIG. 12B, when the second time is longer than the first time and the other vehicles are present within the predetermined distance from the vehicle 100, the processor 870 may output a notification sound to outside of the vehicle or turn on a lamp provided outside the vehicle in a preset manner so as to notify to the other vehicles that the switching to the manual driving mode is delayed.

For example, the processor 870 may output a notification sound (e.g., a klaxon) to the outside of the vehicle to notify to the other vehicles that the manual driving mode switching of the vehicle is delayed.

Turning on the lamp provided outside the vehicle in the preset manner may be performed in various ways.

For example, as illustrated in (b) of FIG. 12B, turning on the lamp provided outside the vehicle in the preset manner is to notify the other vehicles of the delay in the manual driving switching of the vehicle, and may correspond to outputting notification information on a road surface using a beam projector provided in the vehicle, turning on a lamp (e.g., a fog lamp or an emergency lamp) provided in the vehicle, or turning on a sensor (may be provided on a roof of the vehicle) required for autonomous driving.

Thereafter, the processor 870 may stop the output of the notification sound or the turn-on of the lamp when the manual driving authority is transferred due to the driver being able to perform the manual driving (i.e., when the autonomous driving mode is switched to the manual driving mode) (S1250).

With this configuration, the present invention can prepare a driver for manual driving more quickly within the vehicle, and also notify a delay in switching to a manual driving mode to other adjacent vehicles, which may result in remarkably enhancing stability when switching a driving mode from an autonomous driving mode into the manual driving mode.

Meanwhile, according to the present invention, a time point of starting a switching process into a manual driving mode may differ according to a current state of a driver.

Figure 13:
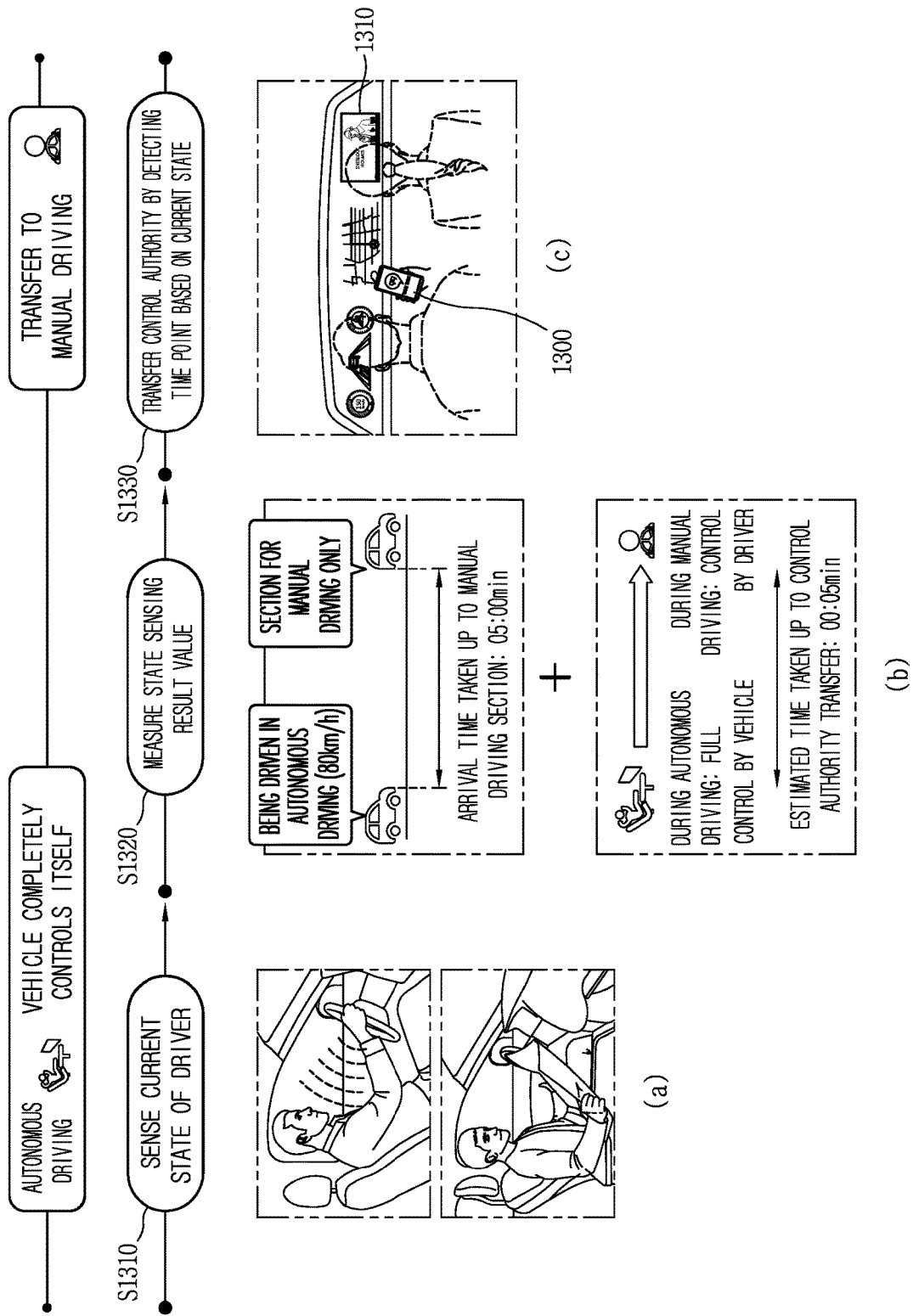

Referring to (a) of FIG. 13, the processor 870 of the present invention may sense a state of a driver aboard a vehicle which is currently driven in an autonomous driving mode through the sensing unit 820 (S1310). The related contents will be understood by the foregoing description.

Thereafter, the processor 870 of the present invention may decide a first time required for the vehicle currently traveling in the autonomous driving mode to reach a point to be driven in the manual driving mode, and a second time required for the driver to be ready to perform manual driving (S1320).

At this time, there may be a case where the second time (5 seconds) is shorter than the first time (5 minutes).

In this case, when the second time is shorter than the first time, the processor 870 may switch a driving mode of the vehicle from the autonomous driving mode into the manual driving mode based on that the driver is ready to perform the manual driving.

When the second time is shorter than the first time, the processor 870 may not output notification information. However, the processor 870 may start the switching to the manual driving mode, in response to a user request. In addition, the processor 870 may output a graphic object through an output unit to notify that the switching to the manual driving mode is possible when the second time is shorter than the first time.

At this time, the processor 870 may decide a switching time point to the manual driving mode based on a current state of the driver (S1330).

For example, as illustrated in (c) of FIG. 13, when the second time (the time required for the driver to be ready to perform the manual driving) is shorter than the first time (the time required for the vehicle to reach the point to be switched into the manual driving mode), the processor 870 may switch the driving mode of the vehicle from the autonomous driving mode to the manual driving mode based on at least one of a complete use of the mobile terminal 1300 of the driver and a termination of a playback of a content 1310.

In detail, the processor 870 may be connected to the mobile terminal of the driver to perform communication. The processor 870 may determine a type of application or content executed in the mobile terminal.

In addition, the processor 870 may determine a content being played back on the vehicle (for example, a moving picture (video) currently output on the display module 251).

The processor 870 may start switching to the manual driving mode based on an end time point of the content currently played back on the mobile terminal or the vehicle when the second time is shorter than the first time.

For example, when a message is being typed on the mobile terminal or a video is being played back, the processor 870 may start the switching to the manual driving mode, starting from an end time point of the typing or the playback of the video.

On the other hand, when the second time is shorter than the first time and the driver is ready to perform the manual driving (when a manual driving preparation is completed), the processor 870 may output a graphic object, which notifies that the switching to the manual driving mode can start, on the display (the display of the mobile terminal or the vehicle) on which the content is currently played back.

When the graphic object is touched by the driver, the processor 870 may stop the playback of the content and switch the driving mode of the vehicle from the autonomous driving mode to the manual driving mode (i.e., the processor 870 may start the switching to the manual driving mode in a stepwise manner).

With such a configuration, the present invention can provide a vehicle control device, capable of switching the driving mode of the vehicle from the autonomous driving mode to the manual driving mode at an optimized time point when the preparation for manual driving of the driver is completed before reaching the point where the vehicle should be driven in the manual driving mode.

Meanwhile, the present invention may switch the driving mode of the vehicle from the automatic driving mode to the manual driving mode in a section where the vehicle can travel in the autonomous driving mode, according to various conditions.

Figure 14:
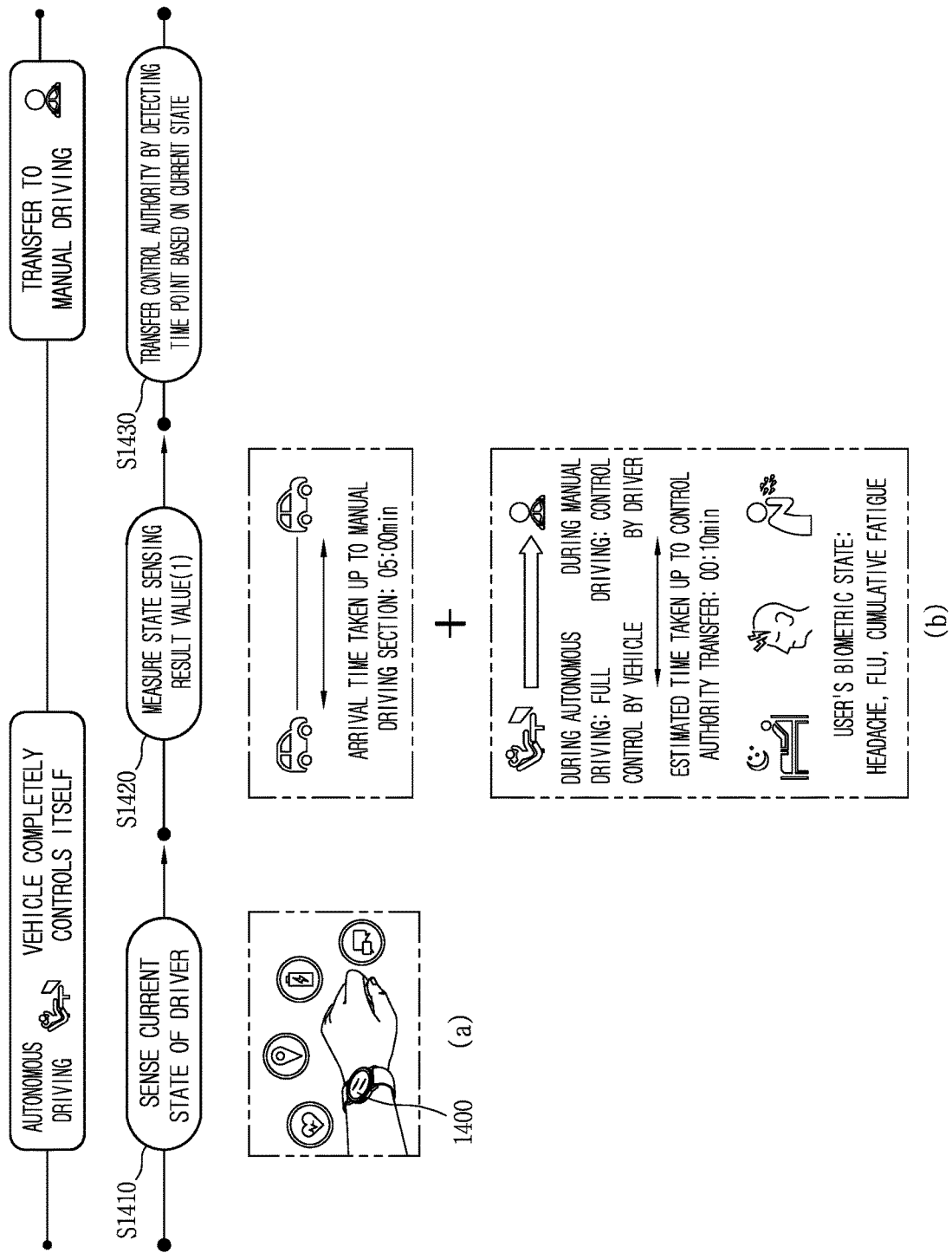

Referring to FIG. 14, the vehicle control device 800 of the present invention may include a communication unit capable of performing communication with a wearable terminal 1400 worn on a driver's body. The communication unit may be the communication device 400 described above.

The wearable terminal may sense the driver's state as illustrated in (a) of FIG. 14. For example, the driver's state sensed by the wearable terminal may be biometric information.

The processor 870 may vary a second time required for the driver to be ready to perform manual driving, based on the driver's state sensed through the wearable terminal (or the driver's state (the driver's biometric information) sensed through the biometric sensing unit included in the sensing unit 820).

For example, the processor 870 may decide the first time required for the vehicle currently traveling in the autonomous driving mode to reach the point to be driven in the manual driving mode, and the second time required for the driver to be ready to perform the manual driving (S1420).

At this time, the processor 870 may extend or shorten the second time when the driver's state sensed through the wearable terminal (or the biometric sensing unit) corresponds to a preset condition (e.g., when unexpected symptoms of the driver (blood pressure out of a normal range, a pulse out of a normal range, body temperature out of a normal range, or the like) are detected).

The processor 870 may perform the aforementioned control of the vehicle (for example, outputting notification information, controlling a speed of the vehicle, outputting a notification sound around the vehicle, or turning on a lamp), based on the extended or shortened second time and the first time (S1430).

Figure 15:
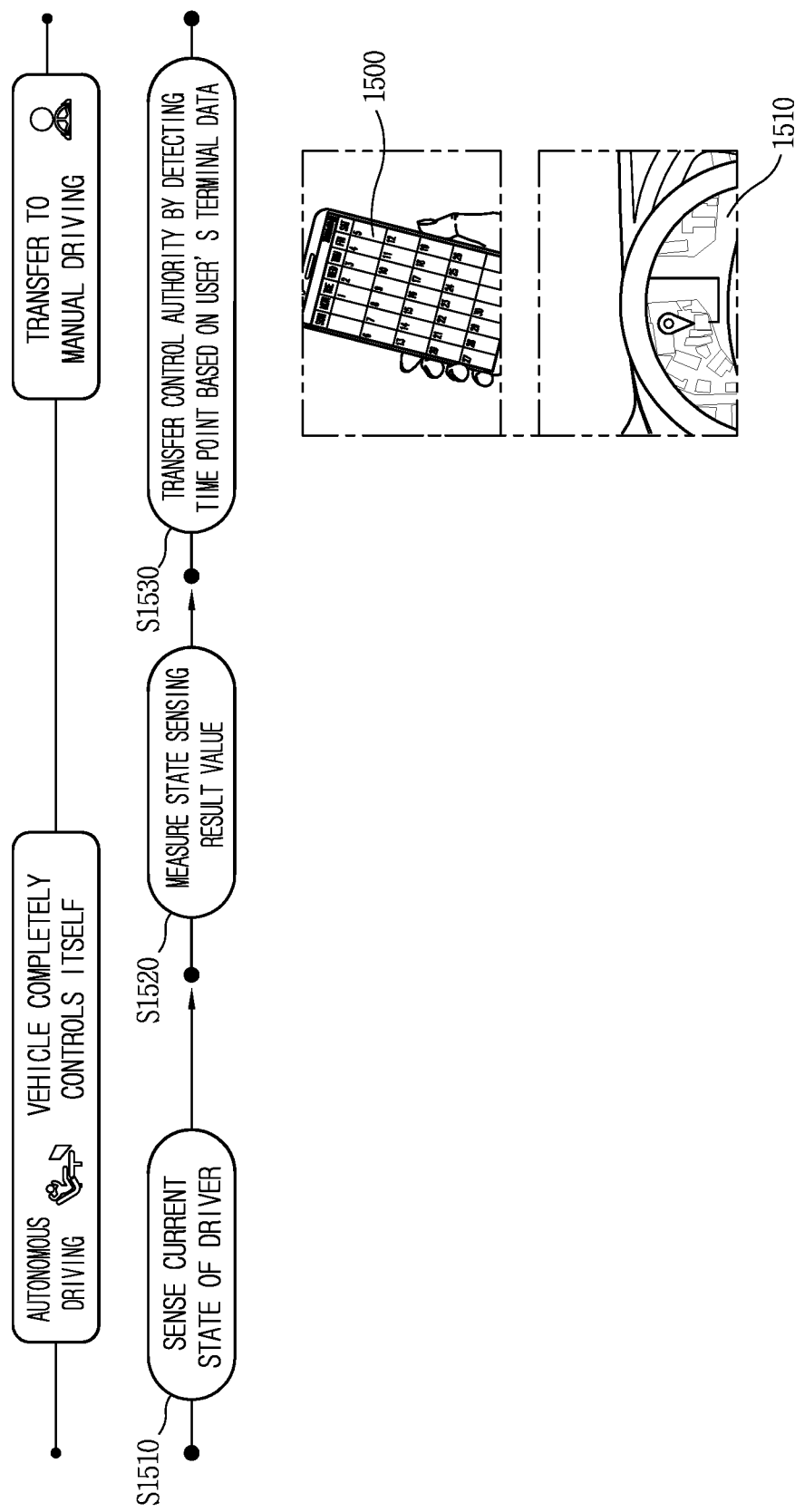

Referring to FIG. 15, the processor of the present invention may sense a state of a driver and decide a first time (5 minutes) and a second time (10 seconds) (S1510 and S1520).

At this time, the processor 870 may output notification information such that the driver can be ready to perform manual driving, irrespective of a point where the vehicle currently traveling in an autonomous driving mode is to be switched to a manual driving mode, based on schedule information and a current time (S1530).

The schedule information may be schedule information stored in a mobile terminal connected to the vehicle control device to perform communication, or schedule information stored in the vehicle (or the vehicle control device).

When the schedule information has been registered in the current time, or registered within a predetermined time from the current time, the driver may have to move to a place registered in the schedule information within a short time.

At this time, it may be assumed that a time required to move to the place can be more shortened when traveling in the manual driving mode than traveling in the autonomous driving mode.

In this case, the processor 870 may output notification information such that the driver's manual driving can be made quickly (i.e., the driver can be ready to perform the manual driving), irrespective of the point (or the first time) where the vehicle currently traveling in the autonomous driving mode is to be switched to the manual driving mode.

The way and form of outputting the notification information may be the same/like to the foregoing description.

With such a configuration, the present invention can provide a new vehicle control device, capable of proposing switching to a manual driving mode for each situation to a driver, and a method of controlling the vehicle.

Figure 16:
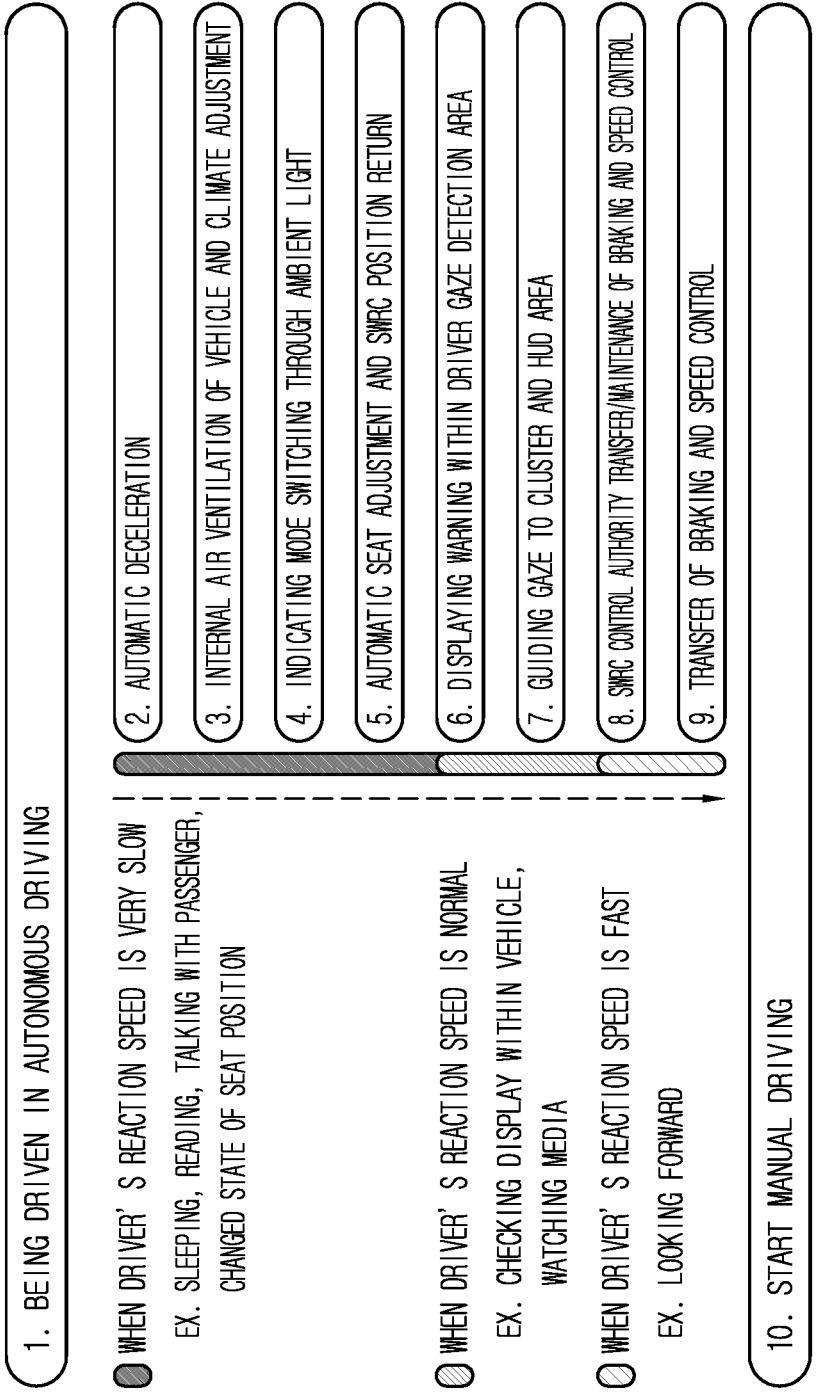

FIG. 16 illustrates a step of switching a driving mode of the vehicle from an autonomous driving mode to a manual driving mode according to one embodiment of the present invention.

A second time according to the present invention, namely, a time required for a driver to be ready to perform manual driving may differ according to a reaction speed of the driver.

For example, the second time may be more shortened when the reaction speed of the driver is faster.

Information related to the reaction speed of the driver may be stored in the memory.

The processor 870 may differently set a step of switching to a manual driving mode according to the reaction speed of the driver.

For example, as illustrated in FIG. 16, 1. while the vehicle is currently driven in an autonomous driving mode, when the driver's reaction speed is fast (for example, when the reaction speed of the driver is a first speed or when the driver is looking forward), the step of switching to the manual driving mode may only include 8. transferring a control authority for a steering wheel (SWRC) and maintaining braking and speed control, and 9. transferring even the braking and speed control.

On the other hand, when the response speed of the driver is normal (for example, when the driver's reaction speed is a second speed slower than the first speed or when the driver watches a content within the vehicle), the step of switching to the manual driving mode may further include at least one of 6. outputting warning information within an area of detecting the driver's gaze, and 7. guiding the driver's gaze to a cluster and an HUD area.

On the other hand, when the response speed of the driver is slow (for example, when the reaction speed of the driver is a third speed slower than the second speed or in a case of at least one of the driver's sleeping, the driver's reading or a change in a seat position), the step of switching to the manual driving mode may further include at least one of 1. decelerating the vehicle, 3. ventilating internal air of the vehicle, 4. turning on a lamp or display within the vehicle to notify the mode switching, and 5. returning a seat and a steering wheel to their original positions to enable the manual driving.

On the other hand, according to the driver's reaction speed or the driver's state, the processor 870 may decide a step of starting the switching to the manual driving mode (one of 2 to 9), and sequentially (selectively among those steps illustrated in FIG. 16) perform the switching to the manual driving mode in a stepwise manner.

Thereafter, the processor 870 may perform 10. switching the driving mode of the vehicle to the manual driving mode Through those steps of FIG. 16.

It should be understood that those steps illustrated in FIG. 16 are merely illustrative, and are not limited to thereto.

According to an embodiment of the present invention, one or more of the following effects can be obtained.

First, the present invention can provide a vehicle control device, capable of providing a notification (feedback) to a driver such that the driver can be ready to perform manual driving before a vehicle reach a point where a driving mode of the vehicle is to be switched from an autonomous driving mode to a manual driving mode, and a method of controlling the vehicle.

Second, the present invention can provide a vehicle control device, capable of switching a driving mode of a vehicle from an autonomous driving mode to a manual driving mode in an optimized manner by comparing a remaining time until switching to the manual driving mode with a time required for a driver to be ready to perform manual driving, and a method of controlling the vehicle.

The effects of the present invention are not limited to those effects mentioned above, and other effects not mentioned may be clearly understood by those skilled in the art from the description of the appended claims.

The vehicle control device 800 described above may be included in the vehicle 100.

The operation or control method of the vehicle control device 800 described above may be applied to an operation or control method of the vehicle 100 (or the control unit 170) in the same or similar manner.

For example, the control method of the vehicle 100 (or the control method of the vehicle control device 800) may include deciding a first time required for a vehicle currently traveling in an autonomous driving mode to reach a point to be switched to a manual driving mode, deciding a second time required for a driver to be ready to perform manual driving on the basis of the driver's state, and outputting notification information such that the second time shortened when the second time is longer than the first time.

Here, the outputting may be configured to outputting the notification information such that the second time becomes shorter than the first time.

The control method of the vehicle 100 (or the control method of the vehicle control device 800) of the present invention may further include re-deciding the second time required for the driver to be ready to perform the manual driving after the output of the notification information, and deciding whether or not to output the notification information based on the re-decided second time and the first time.

Each of the steps may be performed not only by the vehicle control device 800 but also by the controller 170 provided in the vehicle 100.

Further, all functions, configurations, or control methods performed by the vehicle control device 800 described above may be performed by the controller 170 provided in the vehicle 100. That is, all of the control methods described in this specification may be applied to a control method of a vehicle or a control method of a control device.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A control device for a vehicle, comprising:
a sensor configured to sense a first state of a driver of the vehicle and a state of a passenger of the vehicle;
at least one processor; and
a computer-readable medium coupled to the at least one processor having stored thereon instructions which, when executed by the at least one processor, causes the at least one processor to perform operations comprising:
determining that the vehicle is operating in an autonomous driving mode;
based on the determination that the vehicle is operating in the autonomous driving mode, determining a first time corresponding to an estimated travel time between a current location of the vehicle to a manual driving section where the vehicle is to be switched to a manual driving mode;
determining, based on the first state of the driver, a second time corresponding to an estimated preparation time needed by the driver to prepare to manually drive the vehicle;
determining whether the second time is greater than the first time;
based on the determination that the second time is less than or equal to the first time, updating the first state of the driver; and
based on the determination that the second time is greater than the first time, performing an action associated with the vehicle,
wherein the performing an action associated with the vehicle comprises:
determining that a passenger is present;
based on the determination that a passenger is present, outputting, to the passenger,
a third notification configured to decrease the second time;
determining a third time corresponding to an estimated preparation time needed by the passenger to prepare to manually drive the vehicle;
determining that (i) the second time is greater than the first time, (ii) the third time is less than or equal to the first time, and (iii) the passenger is ready to manually drive the vehicle; and
based on the determination that (i) the second time is greater than the first time, (ii) the third time is less than or equal to the first time, and (iii) the passenger is ready to manually drive the vehicle, granting a manual driving authority of the vehicle to a driving device corresponding to the passenger.

2. The control device of claim 1, wherein the performing an action associated with the vehicle comprises:
based on the determination that the second time is greater than the first time, outputting a first notification configured to decrease the second time.

3. The control device of claim 2, wherein the performing an action associated with the vehicle comprises:
after outputting the first notification, updating the first and second times;
determining that the updated second time is greater than the updated first time; and
based on the determination that the updated second time is greater than the updated first time, outputting a second notification configured to decrease the updated second time.

4. The control device of claim 1, wherein the performing an action associated with the vehicle comprises:
based on the determination that the second time is greater than the first time, decelerating the vehicle without coming to a complete stop to increase the first time.

5. The control device of claim 1, wherein the performing an action associated with the vehicle comprises:
determining that a difference between the first time and the second time is less than a first predetermined time; and
based on the determination that the difference between the first time and the second time is less than the first predetermined time, initiating switching of a driving mode of the vehicle from the autonomous driving mode to the manual driving mode.

6. The control device of claim 5, wherein the initiating switching of the driving mode of the vehicle from the autonomous driving mode to the manual driving mode comprises:
performing a series of preset steps configured to progressively enable manual driving of the vehicle by the driver.

7. The control device of claim 1, wherein the performing an action associated with the vehicle comprises:
determining that a current time is within a second predetermined time from a scheduled time of a scheduled event of the driver; and
based on the determination that the current time is within the second predetermined time from the scheduled time of the scheduled event of the driver, outputting a fifth notification configured to prepare the driver to manually drive the vehicle.

8. A vehicle comprising:
a plurality of wheels;
a power source configured to drive at least one of the plurality of wheels; and
the control device of claim 1.

9. The control device of claim 1, wherein the manual driving authority has been granted to the driving device corresponding to the passenger, and wherein the performing an action associated with the vehicle comprises:
determining, based on the first state of the driver, that the driver is ready to manually drive the vehicle; and
based on the determination that the driver is ready to manually drive the vehicle, transferring the manual driving authority of the vehicle from the driving device corresponding to the passenger to a driving device corresponding to the driver.

10. The control device of claim 1, wherein the performing an action associated with the vehicle comprises:
determining that (i) the second time is greater than the first time, and (ii) nearby vehicles are present within a predetermined distance from the vehicle; and
based on the determination that (i) the second time is greater than the first time, and (ii) nearby vehicles are present within a predetermined distance from the vehicle, performing at least one action configured to notify the nearby vehicles of a potential delay in switching to the manual driving mode.

11. The control device of claim 10, wherein the at least one action configured to notify the nearby vehicles of a potential delay in switching to the manual driving mode comprises one or more of:

(i) outputting a notification sound to an exterior of the vehicle; or (ii) turning on a lamp provided on the exterior of the vehicle in a preset manner.

12. The control device of claim 1, wherein the performing an action associated with the vehicle comprises:

determining that the second time is equal to or less than the first time; and based on the determination that the second time is equal to or less than the first time, maintaining the autonomous driving mode and withholding notifications related to the switch to the manual driving mode.

13. The control device of claim 1, wherein the performing an action associated with the vehicle comprises:

determining that (i) the second time is equal to or less than the first time, and (ii) the driver is ready to manually drive the vehicle; and based on the determination that (i) the second time is equal to or less than the first time, and (ii) the driver is ready to manually drive the vehicle, switching a driving mode of the vehicle from the autonomous driving mode to the manual driving mode.

14. The control device of claim 13, wherein the determining that the driver is ready to manually drive the vehicle comprises:

determining at least one of (i) a completion of a use of a mobile terminal by the driver, or (ii) a termination of a content currently being played back by the vehicle; and based on the determination of at least one of (i) the completion of the use of the mobile terminal by the driver, or (ii) the termination of the content currently being played back by the vehicle, determining that the driver is ready to manually drive the vehicle, and wherein the performing an action associated with the vehicle comprises:

based on the determination that the driver is not ready to manually drive the vehicle, outputting a fourth notification configured to prepare the driver to manually drive the vehicle.

15. The control device of claim 1, further comprising a communication unit configured to communicate with a wearable terminal worn by the driver, wherein the operations comprise:

receiving, through the communication unit, a second state of the driver from the wearable terminal; and updating the second time based on the second state of the driver.

16. A method for controlling a vehicle, comprising:

determining, by the vehicle, that the vehicle is operating in an autonomous driving mode;

based on the determination that the vehicle is operating in the autonomous driving mode, determining, by the vehicle, a first time corresponding to an estimated travel time between a current location of the vehicle to a manual driving section where the vehicle is to be switched to a manual driving mode;

obtaining, from a sensor of the vehicle, a first state of a driver of the vehicle and a state of a passenger of the vehicle;

determining, based on the first state of the driver, a second time corresponding to an estimated preparation time needed by the driver to prepare to manually drive the vehicle;

determining whether the second time is greater than the first time;

based on the determination that the second time is less than or equal to the first time, updating the first state of the driver; and based on the determination that the second time is greater than the first time, performing an action associated with the vehicle, wherein the performing the action associated with the vehicle comprises:

determining that a passenger is present;

based on the determination that a passenger is present, outputting, to the passenger, a third notification configured to decrease the second time;

determining a third time corresponding to an estimated preparation time needed by the passenger to prepare to manually drive the vehicle;

determining that (i) the second time is greater than the first time, (ii) the third time is less than or equal to the first time, and (iii) the passenger is ready to manually drive the vehicle; and based on the determination that (i) the second time is greater than the first time, (ii) the third time is less than or equal to the first time, and (iii) the passenger is ready to manually drive the vehicle, granting a manual driving authority of the vehicle to a driving device corresponding to the passenger.

17. The method of claim 16, wherein the performing an action associated with the vehicle comprises:

based on the determination that the second time is greater than the first time, outputting a first notification configured to decrease the second time.

18. The method of claim 17, wherein the performing an action associated with the vehicle comprises:

updating, by the vehicle, the first and second times after outputting the first notification;

determining, by the vehicle, that the updated second time is greater than the updated first time; and based on the determination that the updated second time is greater than the updated first time, outputting, by the vehicle, a second notification configured to decrease the updated second time.

* * * * *